(12) United States Patent
Warashina et al.

(10) Patent No.: US 10,670,461 B2
(45) Date of Patent: Jun. 2, 2020

(54) OPTICAL INTERFEROMETER

(71) Applicant: HAMAMATSU PHOTONICS K.K., Hamamatsu-shi, Shizuoka (JP)

(72) Inventors: Yoshihisa Warashina, Hamamatsu (JP); Tomofumi Suzuki, Hamamatsu (JP); Kohei Kasamori, Hamamatsu (JP); Ryosuke Okumura, Hamamatsu (JP); Kyosuke Kotani, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/748,286

(22) PCT Filed: Sep. 3, 2015

(86) PCT No.: PCT/JP2015/075105
§ 371 (c)(1),
(2) Date: Jan. 29, 2018

(87) PCT Pub. No.: WO2017/017859
PCT Pub. Date: Feb. 2, 2017

(65) Prior Publication Data
US 2018/0217001 A1    Aug. 2, 2018

(30) Foreign Application Priority Data
Jul. 30, 2015 (JP) .................. 2015-150546

(51) Int. Cl.
*G01J 3/45* (2006.01)
*G01B 9/02* (2006.01)

(52) U.S. Cl.
CPC ............ *G01J 3/45* (2013.01); *G01B 9/02017* (2013.01); *G01B 9/02022* (2013.01);
(Continued)

(58) Field of Classification Search
CPC ....................................................... G01J 3/45
(Continued)

(56) References Cited

U.S. PATENT DOCUMENTS 3,976,379 A * 8/1976 Morokuma ........ G01B 9/02003
356/487
5,412,474 A   5/1995 Reasenberg et al.
(Continued)

FOREIGN PATENT DOCUMENTS

CN    102735163 A    10/2012
JP    S63-241306 A   10/1988
(Continued)

OTHER PUBLICATIONS

International Preliminary Report on Patentability dated Feb. 8, 2018 for PCT/JP2015/075105.

*Primary Examiner* — Tarifur R Chowdhury
*Assistant Examiner* — Omar H Nixon
(74) *Attorney, Agent, or Firm* — Faegre Drinker Biddle & Reath LLP

(57) ABSTRACT

An optical interferometer includes a branching-combining unit, a first optical system, a second optical system, and a drive unit. The branching-combining unit includes a branching surface, an incident surface, a first output surface, a combining surface, and a second output surface on an interface of a transparent member, the branching surface partially reflects incident light and outputs as first branched light, and transmits the rest of the incident light into the interior as second branched light, the combining surface partially combines the first branched light and the second branched light to be output to the outside as first combined light, and combines the rest of the first branched light and the second branched light to be propagated into the interior as (Continued)

second combined light, and the second output surface partially outputs the second combined light to the outside.

8 Claims, 14 Drawing Sheets

(52) U.S. Cl.
CPC ..... *G01B 9/02044* (2013.01); *G01B 9/02058* (2013.01); *G01B 9/02059* (2013.01)

(58) Field of Classification Search
USPC .......................................................... 356/451
See application file for complete search history.

(56) References Cited

U.S. PATENT DOCUMENTS

| | | | |
|---|---|---|---|
| 6,233,054 B1 | 5/2001 | Thériault | |
| 6,469,790 B1 | 10/2002 | Manning | |
| 2007/0121472 A1* | 5/2007 | Wu | G11B 7/1353 369/112.05 |
| 2008/0218836 A1 | 9/2008 | Suzuki et al. | |
| 2010/0309479 A1* | 12/2010 | Yamauchi | G01B 11/2441 356/498 |
| 2011/0043815 A1* | 2/2011 | Giaccari | G01J 3/453 356/451 |
| 2011/0058180 A1 | 3/2011 | Khalil et al. | |
| 2011/0188046 A1* | 8/2011 | Sanders | G01J 3/42 356/451 |
| 2011/0228280 A1* | 9/2011 | Schmitt | H03G 3/3084 356/479 |
| 2014/0016948 A1* | 1/2014 | Iemura | H04B 10/60 398/212 |
| 2015/0062586 A1 | 3/2015 | Zhu et al. | |
| 2015/0093120 A1* | 4/2015 | Sakai | H04B 10/5165 398/188 |
| 2015/0268032 A1* | 9/2015 | de Boer | G03F 7/70775 356/482 |

FOREIGN PATENT DOCUMENTS

| | | |
|---|---|---|
| JP | S63-241435 A | 10/1988 |
| JP | H03-77029 A | 4/1991 |
| JP | H08-105711 A | 4/1996 |
| JP | H09-325005 | 12/1997 |
| JP | 2002-202203 A | 7/2002 |
| JP | 2009-109393 A | 5/2009 |
| JP | 2013-504066 A | 2/2013 |
| WO | WO-2011/031791 A1 | 3/2011 |
| WO | WO-2015/025691 A1 | 2/2015 |
| WO | WO-2015130300 A1 * | 9/2015 ........... E21B 47/123 |

* cited by examiner

OPTICAL INTERFEROMETER

TECHNICAL FIELD

The present invention relates to an optical interferometer.

BACKGROUND ART

An optical interferometer disclosed in Patent Document 1 uses a branching-combining unit made of, for example, silicon to partially reflect incident light on one plane of the branching-combining unit, and transmit the rest of the incident light through the plane, to branch the light into first branched light and second branched light, and combine the first branched light and the second branched light and output as combined light. That is, the optical interferometer commonly uses one plane of the branching-combining unit as the branching surface for branching the incident light into the first branched light and the second branched light and the combining surface for combining the first branched light and the second branched light to form the combined light. Further, in the optical interferometer disclosed in this document, wavelength dispersion occurs when one light of the first branched light and the second branched light reciprocates in the branching-combining unit, and to eliminate the wavelength dispersion, the other light is made to reciprocate in a dispersion compensating member.

An optical interferometer disclosed in Patent Document 2 uses a branching-combining unit made of, for example, silicon to partially reflect incident light on a first principal surface of the branching-combining unit, and transmit the rest of the incident light through the surface, to branch the light into first branched light and second branched light, and combine the first branched light and the second branched light on a second principal surface of the branching-combining unit and output as combined light. That is, the optical interferometer uses different surfaces as the branching surface (first principal surface) for branching the incident light into the first branched light and the second branched light and the combining surface (second principal surface) for combining the first branched light and the second branched light to form the combined light. The optical interferometer disclosed in this document can decrease the wavelength dispersion, because each of the first branched light and the second branched light passes through the branching-combining unit only once.

CITATION LIST

Patent Literature

Patent Document 1: Japanese Patent Application Laid-Open Publication No. 2013-504066
Patent Document 2: Japanese Patent Application Laid-Open Publication No. H3-77029

SUMMARY OF INVENTION

Technical Problem

Inventors of the present invention have found that the conventional optical interferometers, including those disclosed in Patent Documents 1 and 2, have the following problem. That is, the conventional optical interferometers have a low light use efficiency, because only a small ratio of incident light is used in the combined light. Generally, in the optical interferometer, light loss which is inevitable in principle is generated on the branching surface and the combining surface, and further, additional light loss (hereinafter referred to as "excessive loss") is generated.

The present invention has been made in order to solve the above problem, and an object thereof is to provide an optical interferometer capable of decreasing a ratio of excessive loss.

Solution to Problem

An optical interferometer according to the present invention includes a branching-combining unit, a first optical system, a second optical system, and a drive unit. The branching-combining unit includes a branching surface, an incident surface, a first output surface, a combining surface, and a second output surface on an interface between the interior and the exterior of a transparent member, the branching surface and the combining surface are provided separately, the branching surface partially reflects incident light entering from the outside and outputs as first branched light, and transmits the rest of the incident light into the interior as second branched light, the incident surface transmits the first branched light entering from the branching surface via the first optical system into the interior, the first output surface outputs the second branched light reaching from the branching surface through the interior to the outside, the combining surface partially combines the first branched light reaching from the incident surface through the interior, and the second branched light entering from the first output surface via the second optical system to be output to the outside as first combined light, and combines the rest of the first branched light and the second branched light to be propagated into the interior as second combined light, and the second output surface partially outputs the second combined light reaching from the combining surface through the interior to the outside. The first optical system reflects the first branched light output from the branching surface by a mirror, and directs the light to the incident surface. The second optical system reflects the second branched light output from the first output surface by a mirror, and directs the light to the combining surface. The drive unit moves the mirror of the first optical system or the second optical system to adjust an optical path difference between the first branched light and the second branched light from the branching surface to the combining surface.

Advantageous Effects of Invention

The present invention can provide an optical interferometer that can decrease a ratio of excessive loss.

DESCRIPTION OF EMBODIMENTS

Hereinafter, embodiments for carrying out the present invention will be described in detail with reference to the accompanying drawings. In the description of the drawings, the same elements will be denoted by the same reference signs, without redundant description.

The present invention is not limited to these examples, and the Claims, their equivalents, and all the changes within the scope are intended as would fall within the scope of the present invention. Before describing optical interferometers of the embodiments, optical interferometers of comparative examples to be compared with the embodiments are described.

First Comparative Example

Figure 1:
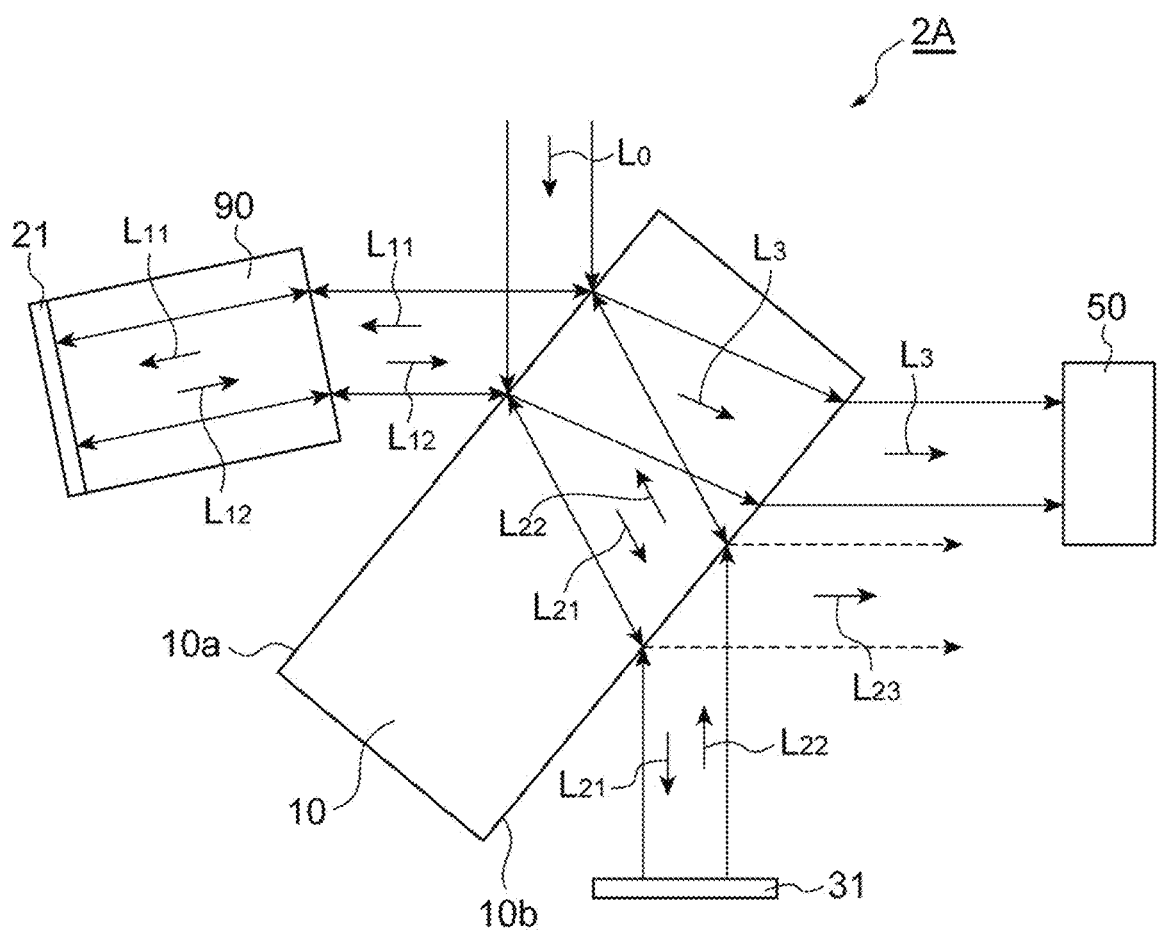
FIG. 1 is a diagram illustrating a configuration of an optical interferometer 2A of a first comparative example.

FIG. 1 is a diagram illustrating a configuration of an optical interferometer 2A of a first comparative example. The optical interferometer 2A includes a branching-combining unit 10, a mirror 21, a mirror 31, and a dispersion compensating member 90.

The branching-combining unit 10 is made of, for example, silicon and has a first principal surface 10a and a second principal surface 10b which are parallel to each other. Incident light $L_0$ that enters from the outside to the first principal surface 10a is partially reflected as first branched light $L_{11}$, and the rest of the incident light transmits into the interior of the branching-combining unit 10 as second branched light $L_{21}$.

The first branched light $L_{11}$ from the first principal surface 10a passes through the interior of the dispersion compensating member 90 and is reflected by the mirror 21. The first branched light $L_{12}$ reflected by the mirror 21 passes through the interior of the dispersion compensating member 90 again, enters the first principal surface 10a, and transmits into the interior of the branching-combining unit 10.

The second branched light $L_{21}$ from the first principal surface 10a passes through the interior of the branching-combining unit 10, transmits through the second principal surface 10b to be output to the outside, and is reflected by the mirror 31. The second branched light $L_{22}$ reflected by the mirror 31 enters the second principal surface 10b, transmits into the interior of the branching-combining unit 10, passes through the interior of the branching-combining unit 10 again, and is reflected by the first principal surface 10a.

The first branched light $L_{12}$ transmitted into the interior of the branching-combining unit 10 on the first principal surface 10a and the second branched light $L_{22}$ reflected on the first principal surface 10a are combined to form combined light $L_3$. The combined light $L_3$ passes through the interior of the branching-combining unit 10, and transmits through the second principal surface 10b to be output to the outside. The combined light $L_3$ output to the outside is detected by a detection unit 50.

In the optical interferometer 2A, the first principal surface 10a of the branching-combining unit 10 is used as both the branching surface for branching the incident light $L_0$ into the first branched light $L_{11}$ and the second branched light $L_{21}$, and the combining surface for combining the first branched light $L_{12}$ and the second branched light $L_{22}$ into the combined light $L_3$.

For example, the position of the mirror 21 is fixed and the mirror 31 is movable by a drive unit along the incident direction of the second branched light $L_{21}$. The drive unit can also be configured by a MEMS-based component. Since the mirror 31 is movable, the optical path difference between the first branched light and the second branched light is adjustable.

In the optical interferometer 2A, the branching-combining unit 10 and the dispersion compensating member 90 are made of the same material (e.g., silicon). Further, the optical path length of a section where the first branched light $L_{11}$, $L_{12}$ reciprocates in the dispersion compensating member 90 is set to be equal to the optical path length of a section where the second branched light $L_{21}$, $L_{22}$ reciprocates in the branching-combining unit 10. This eliminates the problem of wavelength dispersion and decreases wavelength dependency of the optical path difference between the first branched light and the second branched light.

When the optical interferometer 2A is used in an infrared spectroscopic device, such as FTIR (Fourier Transform Infrared Spectroscopy) in which the branching-combining unit 10 is made of quartz glass, the transmission characteristic of quartz glass allows the optical interferometer 2A to be used only in the near-infrared region. Further, quartz glass does not have a high refractive index, so that a dielectric multi-layer film needs to be formed on the surface of the quartz glass for adjusting a branching ratio. Further, a different branching-combining unit 10 made of a material appropriate for each wavelength region can be used, however, in that case, it is necessary to change the branching-combining unit 10 according to the wavelength region and perform optical adjustment, which is inconvenient. Further, in the optical interferometer fabricated by the MEMS technique, it is not possible to freely select the branching-combining unit 10.

To prevent the above problem, it is preferable to use a semiconductor material such as silicon for the branching-combining unit 10. Silicon has a refractive index of around 3.5 in the near-infrared region, and when near-infrared light enters vertically on an interface between silicon and air, the reflectance of Fresnel reflection that occurs due to a difference in refractive index between both media is about 30%. That is, the interface of silicon itself can be used as a branching surface having an appropriate branching ratio, without forming a dielectric multi-layer film for adjusting the branching ratio on the surface of the branching-combining unit 10 made of silicon. In addition, silicon can function as a medium which is transparent up to the far-infrared region (more than several tens of micrometers), so that there is no need to strictly control the thickness. Here, silicon has a larger absorption characteristic in the wavelength region of not longer than 1.1 μm, so that silicon can be used in an infrared region not shorter than 1.1 μm. In the near-infrared region not longer than 1 μm, germanium can be used. Although germanium can be used up to about 5 μm in the mid-infrared region, but has a refractive index of about 4.0, so that germanium achieves a better branching characteristic than that of silicon.

Thus, the branching-combining unit 10 made of a semiconductor material such as silicon or germanium can branch and combine broadband light. On the other hand, however, in the optical interferometer 2A, excessive loss of light is generated, in addition to the light loss which is inevitable in principle in branching and combining. This problem is described below.

When the first branched light $L_{12}$ reflected by the mirror 21 enters the first principal surface 10a, transmitted light transmitted into the interior and reflected light are generated, the transmitted light contributes to interference, and the reflected light does not contribute to interference and becomes a loss. However, this is an inevitable loss in combining and the reflected light becomes the loss which is inevitable in principle.

Similarly, when the second branched light $L_{22}$ reflected by the mirror 31 enters the first principal surface 10a, reflected light and transmitted light are generated, the reflected light contributes to interference, and the transmitted light does not contribute to interference and becomes a loss. However, this is also an inevitable loss in combining and the transmitted light becomes the loss which is inevitable in principle.

However, the reflected light that is generated on the second principal surface 10b when the second branched light $L_{21}$ transmits through the second principal surface 10b to the mirror 31 is not the loss which occurs inevitably in principle, and is the excessive loss. Further, the reflected light that is generated on the second principal surface 10b when the second branched light $L_{22}$ reflected by the mirror 31 transmits through the second principal surface 10b to the first principal surface 10a is not the loss which occurs inevitably in principle, and is the excessive loss. In addition, the reflected light that is generated on the second principal surface 10b when the combined light $L_3$ transmits through the second principal surface 10b and is output to the outside is not the loss which occurs inevitably in principle, and is the excessive loss.

Here, assume that a power reflectance in Fresnel reflection of light on each of the first principal surface 10a and the second principal surface 10b of the branching-combining unit 10 is R. At this time, a power transmittance is 1−R, a branching ratio is R:(1−R). Generally, when light enters an interface between two media having different refractive indexes, the reflectance and transmittance vary depending on a polarization direction and an incident angle of the incident light.

In the optical system of the optical interferometer 2A illustrated in FIG. 1, S-polarization components of the incident light $L_0$ that enter the first principal surface 10a remain as the S-polarization components, and P-polarization components of the incident light $L_0$ remain as the P-polarization components. Further, when the first principal surface 10a and the second principal surface 10b are parallel to each other, and the incident angle of the incident light $L_0$ to the first principal surface 10a is 45 degrees, then the light that enters the first principal surface 10a or the second principal surface 10b from the outside has the incident angle of 45 degrees, and the light that is output from the first principal surface 10a or the second principal surface 10b to the outside also has the output angle of 45 degrees. Therefore, when focused on specific polarization components, the reflectance R is the same. Further, the mirrors 21 and 31 are assumed to have the reflectance of light of 100%.

When the dispersion compensating member 90 is not provided, a light use efficiency $I_{M1}$ of the incident light $L_0$ that reaches the detection unit 50 via the first branched light is calculated by the following formula (1) as a product of the reflectance (R) on the first principal surface 10a, the reflectance (1.0) on the mirror 21, the transmittance (1−R) from the exterior to the interior on the first principal surface 10a, and the transmittance (1−R) from the interior to the exterior on the second principal surface 10b, and thus, the light use efficiency is $R(1-R)^2$.

[Formula 1]

$$I_{M1}=R\times 1.0\times(1-R)\times(1-R)=R(1-R)^2 \quad (1)$$

A light use efficiency $I_{M2}$ of the incident light $L_0$ that reaches the detection unit 50 via the second branched light is calculated by the following formula (2) as a product of the transmittance (1−R) from the exterior to the interior on the first principal surface 10a, the transmittance (1−R) from the interior to the exterior on the second principal surface 10b, the reflectance (1.0) on the mirror 31, the transmittance (1−R) from the exterior to the interior on the second principal surface 10b, the reflectance (R) on the first principal surface 10a, and the transmittance (1−R) from the interior to the exterior on the second principal surface 10b, and thus, the light use efficiency is $R(1-R)^4$.

[Formula 2]

$$I_{M2}=(1-R)\times(1-R)\times 1.0\times(1-R)\times R\times(1-R)=R(1-R)^4 \quad (2)$$

An interference intensity peak $I_{pp}$ of the combined light $L_3$ is represented by the following formula (3).

[Formula 3]

$$I_{pp}=2\times\sqrt{I_{M1}\cdot I_{M2}}=2\sqrt{R(1-R)^2 R(1-R)^4}=2R(1-R)^3 \quad (3)$$

Assume that the branching-combining unit 10 is made of silicon, the refractive index of silicon for the target wavelength is 3.5, and the incident angle is 45 degrees, then the reflectance R of the S-polarization components is about 43% and the reflectance R of the P-polarization components is about 19%. Therefore, when the incident light $L_0$ includes only the S-polarization components, the interference intensity peak $I_{pp}$ of the combined light $L_3$ is 15.9%. Further, when the incident light $L_0$ includes only the P-polarization components, the interference intensity peak $I_{pp}$ of the combined light $L_3$ is 20.2%. When the incident light $L_0$ is in an arbitrary polarization state, the interference intensity peak $I_{pp}$ of the combined light $L_3$ has a value between 15.9% and 20.2%. When the incident light $L_0$ is incoherent light, it is considered that the polarization components of all directions are evenly distributed in the incident light $L_0$, and therefore, the interference intensity peak $I_{pp}$ of the combined light $L_3$ is 18.1% which is an average value of the S-polarization and the P-polarization.

When the dispersion compensating member 90 is provided, and when the reflectance of light is $R_e$ and the transmittance is $(1-R_e)$ on the interface of the dispersion compensating member 90, the light use efficiency $I_{M1}$ of the incident light $L_0$ that reaches the detection unit 50 via the first branched light is calculated by the following formula (φ). The interference intensity peak $I_{pp}$ of the combined light $L_3$ is represented by the following formula (5). That is, by providing the dispersion compensating member 90, the interference intensity peak $I_{pp}$ of the combined light $L_3$ decreases by an amount of the transmittance of light $(1-R_e)$ on the interface of the dispersion compensating member 90.

[Formula 4]

$$I_{M1} = R \times (1-R_c) \times 1.0 \times (1-R_0) \times (1-R) \times (1-R) = R(1-R)^2(1-R_c)^2 \quad (4)$$

[Formula 5]

$$I_{pp} = 2 \times \sqrt{I_{M1} \cdot I_{M2}} = 2\sqrt{R(1-R)^2(1-R_c)^2 R(1-R)^4} = 2R(1-R)^3(1-R_c) \quad (5)$$

When the dispersion compensating member 90 is provided, with the branching-combining unit 10 being provided under the same condition as above, and the light enters the dispersion compensating member 90 vertically, then the reflectance of light $R_c$ on the interface of the dispersion compensating member 90 is 30% regardless of the polarization state, and thus, the average interference intensity peak $I_{pp}$ of the S-polarization and the P-polarization of the combined light $L_3$ is 12.7%. The dispersion compensating member 90 is required in the usual FTIR, and in this case, 12.7% is the maximum value of the interference intensity peak $I_{pp}$ of the combined light $L_3$.

If no excessive loss occurs in the configuration of the optical interferometer 2A illustrated in FIG. 1, the light use efficiency $I_{M1}$ of the incident light $L_0$ that reaches the detection unit 50 via the first branched light is calculated by the following formula (6). The same formula can be applied to calculate the light use efficiency $I_{M2}$ of the incident light $L_0$ that reaches the detection unit 50 via the second branched light. The interference intensity peak $I_{pp}$ of the combined light $L_3$ is represented by the following formula (7). Assume that no excessive loss exists, the average interference intensity peak $I_{pp}$ of the S-polarization and the P-polarization of the combined light $L_3$ is 39.9% (=(49.0+30.8)/2). Thus, the ratio of the excessive loss is 68% (=(39.9−12.7)/39.9).

[Formula 6]

$$I_{M1} = R \times 1.0 \times (1-R) = R(1-R) \quad (6)$$

[Formula 7]

$$I_{pp} = 2\sqrt{I_{M1} \cdot I_{M2}} = 2\sqrt{R(1-R)R(1-R)} = 2R(1-R) \quad (7)$$

Here, to decrease the excessive loss, AR (anti-reflection) coating may be applied to the second principal surface 10b, however, it is difficult to apply AR coating having a flat wavelength characteristic over a wide wavelength range, so that the wavelength range is limited. Further, when the optical interferometer 2A is formed by the semiconductor process such as MEMS, it is difficult to selectively apply AR coating on a specific surface of the branching-combining unit 10, and if such case happens, an inevitable loss may occur.

Second Comparative Example

Figure 2:
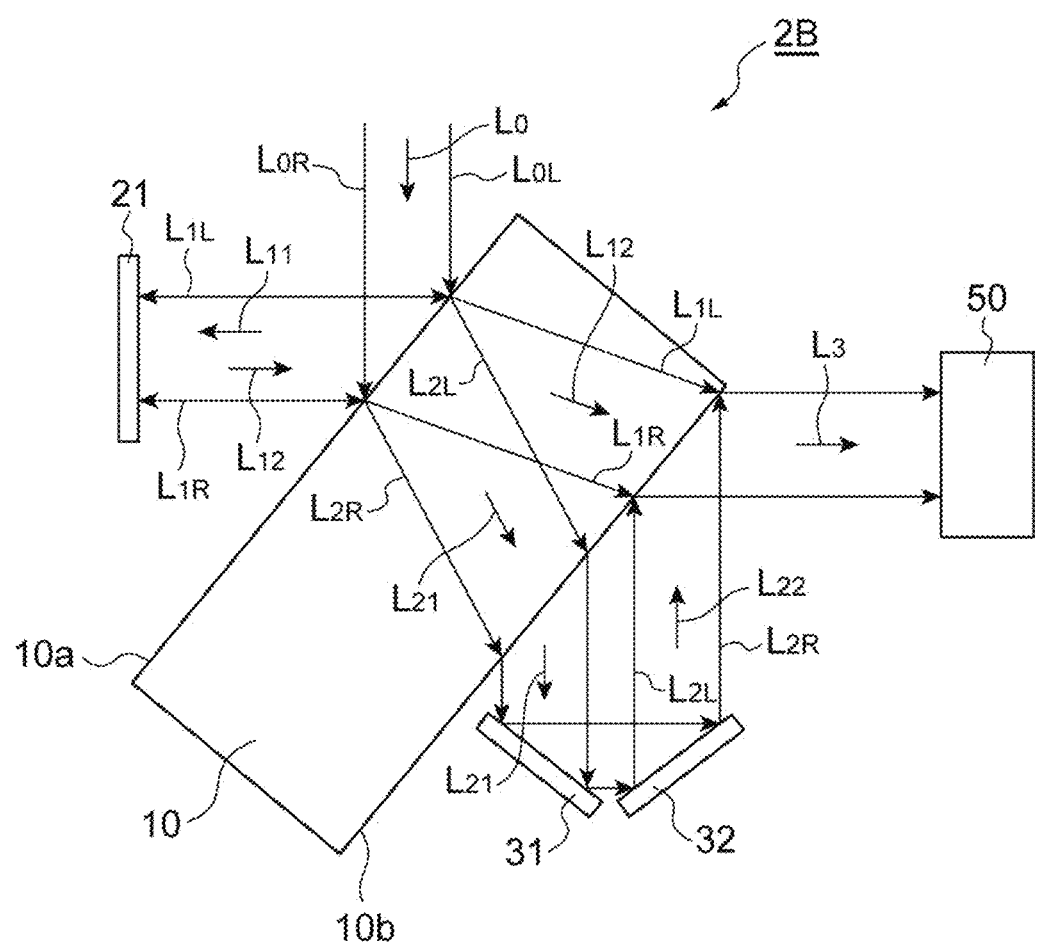
FIG. 2 is a diagram illustrating a configuration of an optical interferometer 2B of a second comparative example.

FIG. 2 is a diagram illustrating a configuration of an optical interferometer 2B of a second comparative example. The optical interferometer 2B includes a branching-combining unit 10, a mirror 21, a mirror 31, and a mirror 32.

The branching-combining unit 10 is made of, for example, silicon and has a first principal surface 10a and a second principal surface 10b which are parallel to each other. Incident light $L_0$ that enters from the outside to the first principal surface 10a is partially reflected as first branched light $L_{11}$, and the rest of the incident light transmits into the interior of the branching-combining unit 10 as second branched light $L_{21}$.

The first branched light $L_{11}$ from the first principal surface 10a is reflected by the mirror 21. The first branched light $L_{12}$ reflected by the mirror 21 enters the first principal surface 10a, transmits into the interior of the branching-combining unit 10, passes through the interior of the branching-combining unit 10, and transmits through the second principal surface 10b to be output to the outside.

The second branched light $L_{21}$ from the first principal surface 10a passes through the interior of the branching-combining unit 10, transmits through the second principal surface 10b to be output to the outside, is reflected by the mirror 31, and is reflected again by the mirror 32. The second branched light $L_{22}$ reflected by the mirrors 31 and 32 enters the second principal surface 10b and is reflected.

The first branched light $L_{12}$ output to the outside on the second principal surface 10b and the second branched light $L_{22}$ reflected on the second principal surface 10b are combined to form combined light $L_3$. The combined light $L_3$ is detected by a detection unit 50.

The optical interferometer 2B uses separate surfaces for the branching surface (first principal surface 10a) to branch the incident light $L_0$ into the first branched light $L_{11}$ and the second branched light $L_{21}$ and for the combining surface (second principal surface 10b) to combine the first branched light $L_{12}$ and the second branched light $L_{22}$ to form the combined light $L_3$.

For example, the position of the mirror 21 is fixed, and the mirrors 31 and 32 are movable by a drive unit along the incident direction of the second branched light $L_{21}$. The drive unit can also be configured by a MEMS-based component. Since the mirrors 31 and 32 are movable, the optical path difference between the first branched light and the second branched light is adjustable.

The optical interferometer 2B of the second comparative example allows the first branched light and the second branched light to pass through the interior of the branching-combining unit 10 only once, thus preventing the problem of wavelength dispersion without using the dispersion compensating member 90, which is required in the optical interferometer 2A of the first comparative example.

Further, the optical interferometer 2B of the second comparative example decreases the excessive loss generated at the interface between the branching-combining unit 10 and a surrounding medium, when compared to the optical interferometer 2A of the first comparative example. The excessive loss in the optical interferometer 2B of the second comparative example is derived only from the reflected light generated on the second principal surface 10b when the second branched light $L_{21}$ transmits through the second principal surface 10b to be output to the outside. The light use efficiency $I_{M1}$ of the incident light $L_0$ that reach the detection unit 50 via the first branched light, and the light use efficiency $I_{M2}$ of the incident light $L_0$ that reach the detection unit 50 via the second branched light, respectively, are $R(1-R)^2$.

An interference intensity peak $I_{pp}$ of the combined light $L_3$ is represented by the following formula (8). Here, the incident angle of the light entering the first principal surface 10a or the second principal surface 10b from the outside is set to 45 degrees. When the branching-combining unit 10 is made of silicon, the average interference intensity peak $I_{pp}$ of the S-polarization and the P-polarization of the combined light $L_3$ is 26.4% (=(27.9+24.9)/2). Therefore, the ratio of the excessive loss is 34% (=(39.9−26.4)/39.9). The excessive loss ratio in the second comparative example is about half of 68% of the excessive loss ratio in the first comparative example.

[Formula 8]

$$I_{pp}=2\times\sqrt{I_{M1}\cdot I_{M2}}=2\sqrt{R(1-R)^2R(1-R)^2}=2R(1-R)^2 \quad (8)$$

Further, the optical interferometer 2B has a problem described below. In the optical interferometer 2B, the branching surface (first principal surface 10a) is different from the combining surface (second principal surface 10b), so that the first branched light is reflected by the single mirror 21 and the second branched light is reflected by the two mirrors 31 and 32 to combine the first branched light and the second branched light on the combining surface. By reflecting the second branched light by the two mirrors 31 and 32, the reflecting position (combining position) of the second branched light on the second principal surface 10b differs from the output position of the second branched light from the interior to the exterior on the second principal surface 10b, and further, coincides with the output position of the first branched light from the interior to the exterior on the second principal surface 10b.

Here, consider light rays $L_{OR}$ and $L_{OL}$ that pass through two different positions in the beam cross-section of the incident light $L_0$. The two light rays $L_{OR}$ and $L_{OL}$ of the incident light $L_0$ propagate through different paths within a plane that is parallel to both the normal line of the first principal surface 10a and the incident direction of the incident light $L_0$. Assume that, in the first branched light $L_{11}$, $L_{12}$, a light ray $L_{1R}$ is derived from one light ray $L_{OR}$ of the incident light $L_0$, and a light ray $L_{1L}$ is derived from the other light ray $L_{OL}$ of the incident light $L_0$. Assume that, in the second branched light $L_{21}$, $L_{22}$, a light ray $L_{2R}$ is derived from one light ray $L_{OR}$ of the incident light $L_0$, and a light ray $L_{2L}$ is derived from the other light ray $L_{OL}$ of the incident light $L_0$.

At this time, on the combining surface (second principal surface 10b), the light ray $L_a$ of the first branched light derived from the one light ray $T_{OR}$ of the incident light $L_0$ is combined with the light ray $L_{21}$ of the second branched light derived from the other light ray $L_{OL}$ of the incident light $L_0$. Further, the light ray $L_{1L}$ of the first branched light derived from the other light ray $L_{OL}$ of the incident light $L_0$ is combined with the light ray $L_{2R}$ of the second branched light derived from the one light ray $L_{OR}$ of the incident light $L_0$.

That is, when the light rays of the first branched light and the second branched light reaching each position of the combining surface (second principal surface 10b) are derived from different light rays of the incident light, these light rays do not form normal interference light even though the light rays are combined to form the combined light. On the other hand, when the incident light $L_0$ is given as a light ray formed by expanding and collimating a single light ray of, for example, a point light source, the light rays of the first branched light and the second branched light reaching each position may interfere with each other, however, the quality of the interference signal may decrease, because the optical path difference is generated by a spatial distance between the light ray $L_{1R}$ and the light ray $L_{1L}$ in the beam cross-section of the first branched light.

Normally, the optical interferometer is expected to have the same optical path difference between the first branched light and the second branched light that reach the respective positions as the optical path difference adjusted by the movement of mirrors. However, in the beam width range provided in the optical interferometer 2B, the optical path difference changes between the beam which is closer to the center and the beam which is closer to the edge portion, whereby an observed interference signal is averaged and weakened as a whole.

An optical interferometer used in FTIR uses light having a large beam diameter in order to increase a parallel nature of the propagating light. As a result, the light includes many beams having different optical path differences, and thus the optical interferometer 2B that uses the combined light beams at different positions as the interference signal has an intrinsic problem with respect to interference.

Further, the following problem would occur when the size of the optical interferometer is decreased. The conventional infrared spectroscopic devices, such as FTIR, are large and less portable, however, recently, a small, lightweight, and highly portable interferometer is desired to respond to the need to perform infrared spectroscopy in the field where a measurement sample is obtained. To satisfy this requirement, Patent Document 1 discloses the invention of the MEMS-based optical interferometer. However, decreasing the size of the MEMS-based optical interferometer would decrease the interference efficiency in the optical interferometer and cause deterioration of visibility by stray light.

Figure 3:
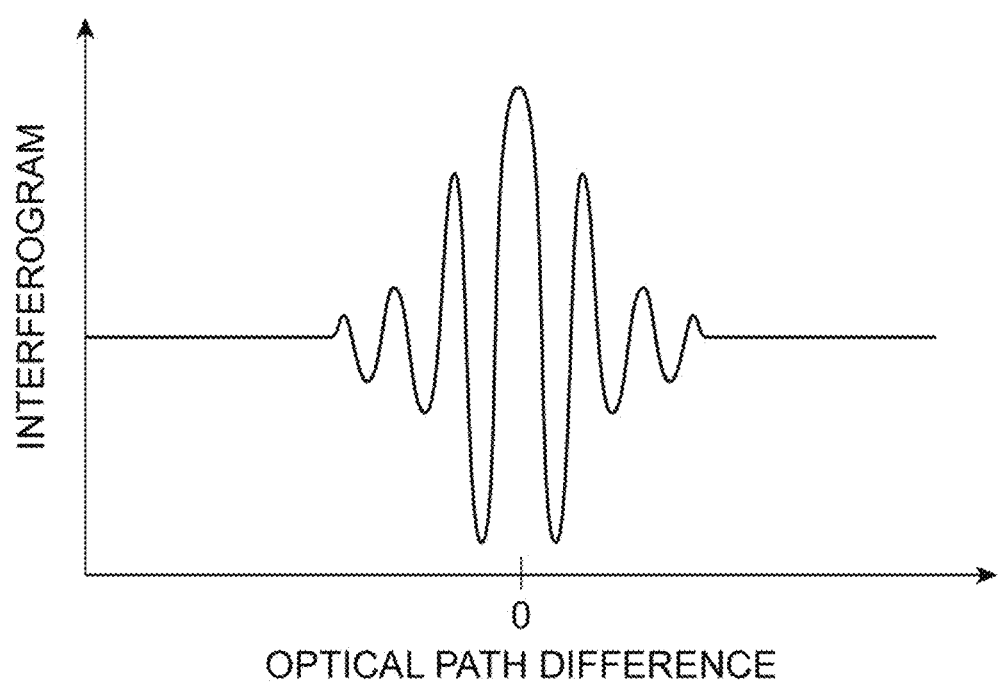
FIG. 3 shows an interferogram when white light enters the optical interferometer.
Figure 4:
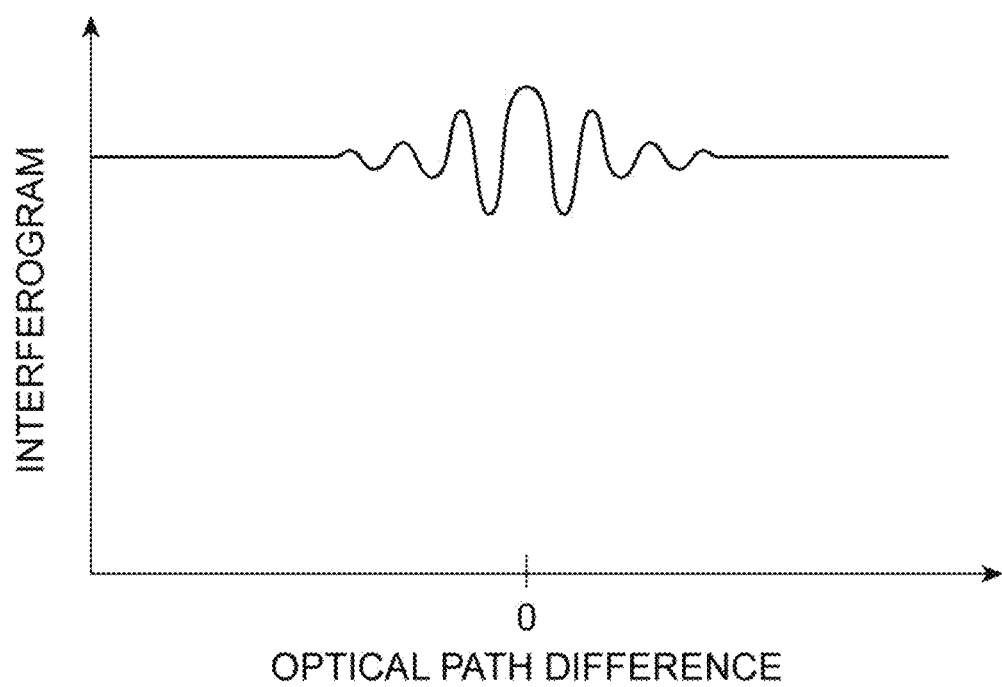
FIG. 4 shows an interferogram when white light enters the optical interferometer.

FIG. 3 and FIG. 4 show interferograms when white light enters the optical interferometer. The horizontal axis represents the difference of the optical path lengths of the first branched light and the second branched light from the branching surface to the combining surface. The vertical axis represents intensity (interferogram) of the combined light $L_3$ (optical interference signal). Since the incident light is white light, the strongest interference occurs when the optical path difference is 0, and the interference becomes weaker as the absolute value of the optical path difference is larger. Assume that an average value of the optical interference signal is m, and a difference between the maximal value and the minimal value of the optical interference signal is δ, then the visibility is represented by δ/(2 m).

The visibility approaches 1 in an ideal optical interferometer in which no stray light exists (FIG. 3). As the stray light increases, the average value m of the optical interference signal increases and the difference δ between the maximal value and the minimal value of the optical interference signal decreases, so that the value of the visibility decreases (FIG. 4). A small optical interferometer is not able to completely collimate the incident light (make the incident light be parallel) which is to be measured, and further, cannot have a sufficiently large branching surface and combining surface, causing a loss by the beam expansion of the light, and further, a phenomenon such as the light that does not contribute to interference reaching the detection unit occurs, thus decreasing the value of the visibility.

For example, when the light to be measured is guided through an optical fiber having a core diameter of 400 μm and NA of 0.2, and output from an output end of the optical fiber into the optical interferometer, the following result is obtained. The beam expansion of the light in the optical interferometer decreases resolution, and the degree of the decrease is a relative accuracy of wavenumber of about 2 (1−cos(NA)). For example, when it is desired to measure the wavenumber 5000 cm$^{-1}$ (wavelength 2 μm) at the resolution of not more than 10 cm$^{-1}$ (4 μm), a relative accuracy of wavenumber needs to be 1/500 and NA needs to be 0.045 by calculating 2 (1−cos(NA))=1/500.

When a collimator lens capable of achieving this NA is inserted, the NA 0.2 beam is converted to the NA 0.045 beam, and the beam size after conversion is 1800 μm which is 0.2/0.045 times the beam size before conversion. In practice, the completely collimated light is not achievable, so that the optical interferometer needs to be configured with a sufficiently large-sized optical system with respect to the beam size.

However, in the case of MEMS, for example, such a large optical system cannot be used. For example, the size limit is about 1 mm, so that most of the beam would be lost. The loss is partially propagated outside of the optical interferometer, and the rest of the loss is received by the detection unit as stray light. The received stray light is not the interference light, and increases the average value m of the above-described interferogram. Further, even when the beam can be propagated in the optical system of the optical interferometer, some beams that cannot be the interference light exist due to beam expansion, and such beams also contribute to increase the average value m of the interferogram. The degree of increase of the average value in of the interferogram depends on the size of the optical system and the optical interferometer. The average value m of the interferogram sometimes becomes several to ten times the difference δ between the maximal value and the minimal value of the optical interference signal.

To remove the influence of the stray light, a signal output from the detection unit needs to be processed. When, however, the combined light (interference light) is weak, an S/N of the signal output from the detection unit would decrease. When the intensity of the interference light is small, it is possible to increase the value of the output signal from the detection unit by increasing a gain of an amplifier in the detection unit, however, when the average value is large, the dynamic range of the amplifier would be fully used for amplification of the average value signal. As described above, the inefficient optical interferometer decreases the signal intensity of the intrinsic optical interference signal, and in addition, causes the increase of the average value till the dynamic range of the first-stage amplifier is fully used, thus further decreasing the S/N when the signal is obtained.

First Embodiment

Figure 5:
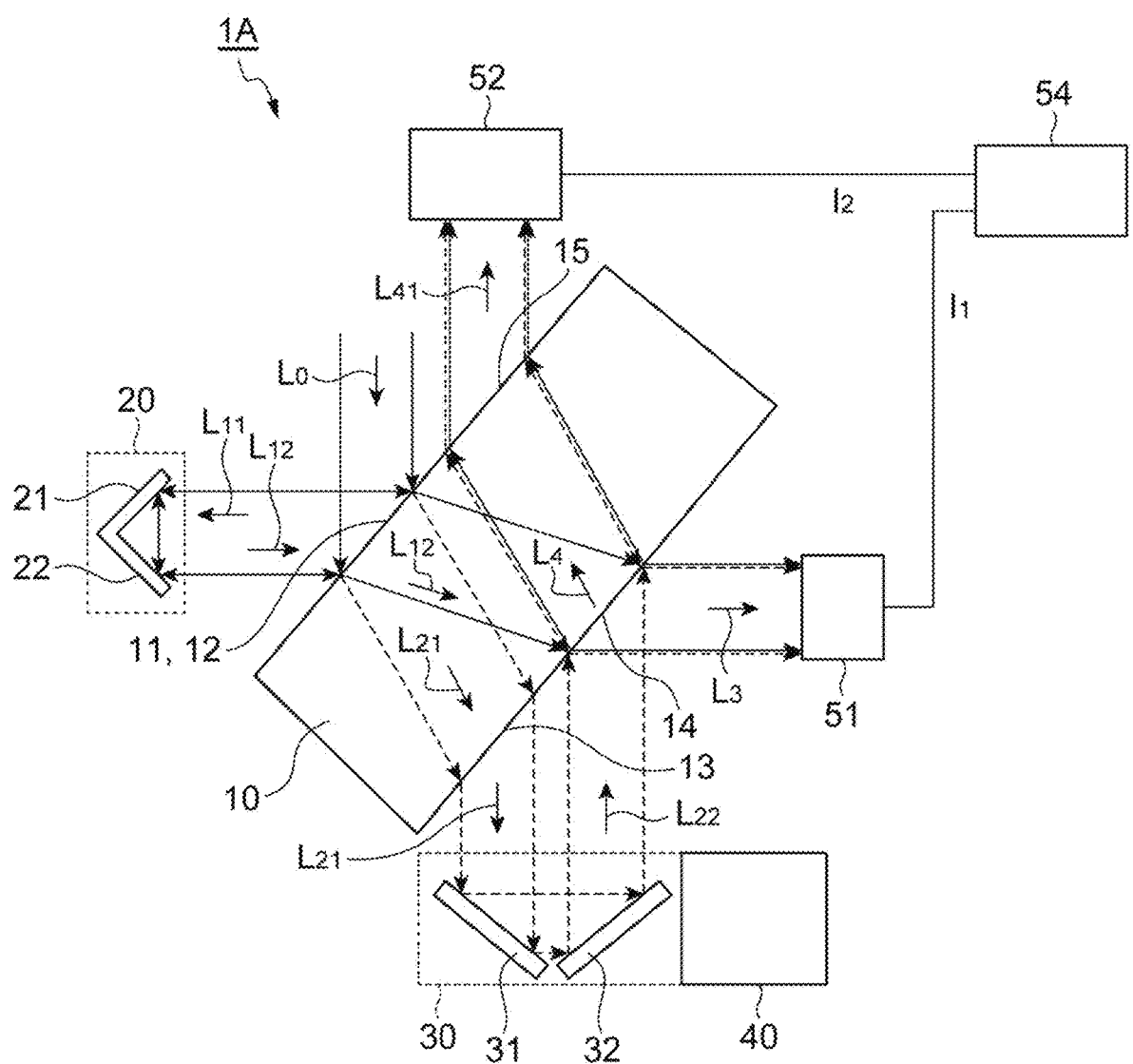
FIG. 5 is a diagram illustrating a configuration of an optical interferometer 1A of a first embodiment.

FIG. 5 is a diagram illustrating a configuration of an optical interferometer 1A of a first embodiment. The optical interferometer 1A includes a branching-combining unit 10, a first optical system 20, a second optical system 30, and a drive unit 40. Preferably, these components of the optical interferometer 1A are configured by MEMS-based components.

The branching-combining unit 10 is made of a transparent member of a semiconductor, such as silicon, and has a branching surface 11, an incident surface 12, a first output surface 13, a combining surface 14, and a second output surface 15 on interfaces between the interior and the exterior of the transparent member.

The branching-combining unit 10, on the branching surface 11, partially reflects incident light $L_0$ that enters from the outside and outputs as first branched light $L_{11}$, and transmits the rest of the incident light into the interior as second branched light $L_{21}$. The branching-combining unit 10, on the incident surface 12, transmits the first branched light $L_{12}$ that enters from the branching surface 11 via the first optical system 20 into the interior. The branching-combining unit 10, on the first output surface 13, outputs the second branched light $L_{21}$ that reaches from the branching surface 11 through the interior to the outside.

The branching-combining unit 10, on the combining surface 14, partially combines the first branched light $L_{12}$ that reaches from the incident surface 12 through the interior, and the second branched light $L_{22}$ that enters from the first output surface 13 via the second optical system 30 to be output to the outside as first combined light $L_3$, and combines the rest of the first branched light and the second branched light to be propagated into the interior as second combined light $L_4$. The branching-combining unit 10, on the second output surface 15, outputs partial light $L_{41}$ of the second combined light $L_4$ that reaches from the combining surface 14 through the interior to the outside.

The first optical system 20 reflects the first branched light $L_{11}$ output from the branching surface 11 by mirrors 21 and 22, and directs the reflected first branched light $L_{12}$ to the incident surface 12. The second optical system 30 reflects the second branched light $L_{71}$ output from the first output surface 13 by mirrors 31 and 32, and directs the reflected second branched light $L_{22}$ to the combining surface 14. The drive unit 40 moves any of the mirrors of the first optical system 20 or the second optical system 30 to adjust an optical path difference between the first branched light and the second branched light from the branching surface 11 to the combining surface 14.

The directions of the branching surface 11, the incident surface 12, the first output surface 13, and the combining surface 14 of the branching-combining unit 10 and the light incident positions and the incident angles on the respective surfaces are set appropriately according to the refractive indexes of the branching-combining unit 10 and the surrounding medium, so that the first branched light and the second branched light are combined coaxially on the combining surface 14 and output as the combined light $L_3$ and the combined light $L_4$ at the same output angle. The first branched light and the second branched light have the same optical path length in the branching-combining unit 10. This eliminates the problem of wavelength dispersion and decreases wavelength dependency of the optical path difference between the first branched light and the second branched light.

The branching surface 11 and the combining surface 14 are provided separately. The branching surface 11, the incident surface 12, and the second output surface 15 may not be parallel to each other, may be parallel to each other, and may be provided on a common plane. An incident region of the incident light $L_0$ on the branching surface 11 and an incident region of the first branched light $L_{12}$ on the incident surface 12 may be different or may coincide with each other partially or entirely. The first output surface 13 and the combining surface 14 may not be parallel to each other, may be parallel to each other, and may be provided on a common plane. An output region of the second branched light $L_{21}$ on the first output surface 13 and an output region of the combined light on the combining surface 14 may be different or may coincide with each other partially or entirely.

The incident light $L_0$ that enters the branching surface 11 from the outside is partially reflected as the first branched light $L_{11}$, and the rest of the incident light transmits into the interior of the branching-combining unit 10 as the second branched light $L_{21}$.

The first branched light $L_{11}$ from the branching surface 11 is reflected by the mirrors 21 and 22 of the first optical system 20. The reflected first branched light $L_{12}$ enters the incident surface 12, transmits into the interior of the branching-combining unit 10, passes through the interior of the branching-combining unit 10, and reaches the combining surface 14.

The second branched light $L_{21}$ from the branching surface 11 passes through the interior of the branching-combining unit 10, transmits through the first output surface 13 to be output to the outside, and is reflected by the mirrors 31 and 32 of the second optical system 30. The reflected second branched light $L_{22}$ reaches the combining surface 14.

A component of the first branched light $L_{12}$ that reaches the combining surface 14 and transmits through the combining surface 14, and a component of the second combined light $L_{22}$ that reaches the combining surface 14 and is reflected by the combining surface 14 are combined and output to the outside as the first combined light $L_3$. The first combined light $L_3$ output to the outside from the combining surface 14 is received by a first light receiving element 51.

A component of the first branched light $L_{12}$ that reaches the combining surface 14 and is reflected by the combining surface 14, and a component of the second combined light $L_{22}$ that reaches the combining surface 14 and transmits through the combining surface 14 are combined and propagated into the interior as the second combined light $L_4$. The second combined light $L_4$ reaches the second output surface 15, and the partial light $L_{41}$ is output to the outside from the second output surface 15. The second combined light $L_{41}$ output to the outside from the second output surface 15 is received by a second light receiving element 52.

The first light receiving element 51, the second light receiving element 52, and a current-voltage conversion unit 54 constitute a detection unit that detects an interference signal. The first light receiving element 51 receives the first combined light $L_3$ output to the outside from the combining surface 14, and outputs a first current signal $I_1$ according to the amount of received light. The second light receiving element 52 receives the second combined light $L_{41}$ output to the outside from the second output surface 15, and outputs a second current signal $I_2$ according to the amount of received light. The current-voltage conversion unit 54 outputs a voltage signal according to a value ($I_1-I_2$) obtained by subtracting the second current signal $I_2$ from the first current signal $I_1$. The detection unit will be described later in detail.

The optical interferometer 1A of the present embodiment has an even number of mirrors in total in the first optical system 20 and the second optical system 30, and therefore can branch the light ray at each position in the beam cross-section of the incident light $L_0$ on the branching surface 11, and then combine the light rays at a common position in the beam cross-section of the combined light $L_3$ and the combined light $L_4$ on the combining surface 14, and thus, the interference efficiency can be improved compared to the configuration of the second comparative example.

Further, the optical interferometer 1A of the present embodiment differs from the configuration of the second comparative example, in that, in addition to the first light receiving element 51 that receives the first combined light $L_3$ output to the outside from the combining surface 14, the second light receiving element 52 receives the second combined light $L_{41}$ output to the outside from the second output surface 15. Thus, the optical interferometer 1A of the present embodiment can decrease the ratio of the excessive loss when compared to the configuration of the second comparative example.

The excessive loss in the present embodiment is calculated as follows. The above formula (8) represents the interference intensity peak $I_{pp}$ of the first combined light $L_3$ which is output from the combining surface 14 and received by the first light receiving element 51. The following formula (11) represents the interference intensity peak $I_{pp}$ of the second combined light $L_{41}$ which is output from the second output surface 15 and received by the second light receiving element 52, obtained by the light use efficiency $I_{M1}$ (the following formula (9)) of the incident light $L_0$ that reaches the second light receiving element 52 via the first branched light, and the light use efficiency $I_{M2}$ (the following formula (10)) of the incident light $L_0$ that reaches the second light receiving element 52 via the second branched light.

When the interference signals of both the first combined light $L_3$ and the second combined light $L_{41}$ can be used, the total interference intensity peak $I_{ppT}$ is represented by the following formula (12) by adding the formula (8) and the formula (11).

[Formula 9]
$$I_{M1}=R\times 1.0\times(1-R)\times R\times(1-R)=R^2(1-R)^2 \qquad (9)$$

[Formula 10]
$$I_{M2}=(1-R)\times(1-R)\times 1.0\times(1-R)\times(1-R)=(1-R)^4 \qquad (10)$$

[Formula 11]
$$I_{pp}=2\times\sqrt{I_{M1}\cdot I_{M2}}=2\sqrt{R^2(1-R)^2(1-R)^4}=2R(1-R)^3 \qquad (11)$$

[Formula 12]
$$I_{ppT}=2R(1-R)^2+2R(1-R)^3=2R(1-R)^2(2-R) \qquad (12)$$

Assume that the incident angle is 45 degrees for all light beams that enters respective surfaces from the outside, and the branching-combining unit 10 is made of silicon, then the average interference intensity peak $I_{ppT}$ of the S-polarization and the P-polarization of the combined light $L_3$ and the combined light $L_{41}$ is 44.5% (=(43.9+45.1)/2). Thus, the ratio of the excessive loss is −11.5% (=(39.9−44.5)/39.9). That is, the present embodiment can achieve an efficiency beyond the limit in principle in the configuration of the second comparative example. This is achieved by using the partial light $L_{41}$ of the second combined light $L_4$ which is intrinsically inevitable loss in principle on the combining surface 14 as an effective interference signal.

Figure 6:
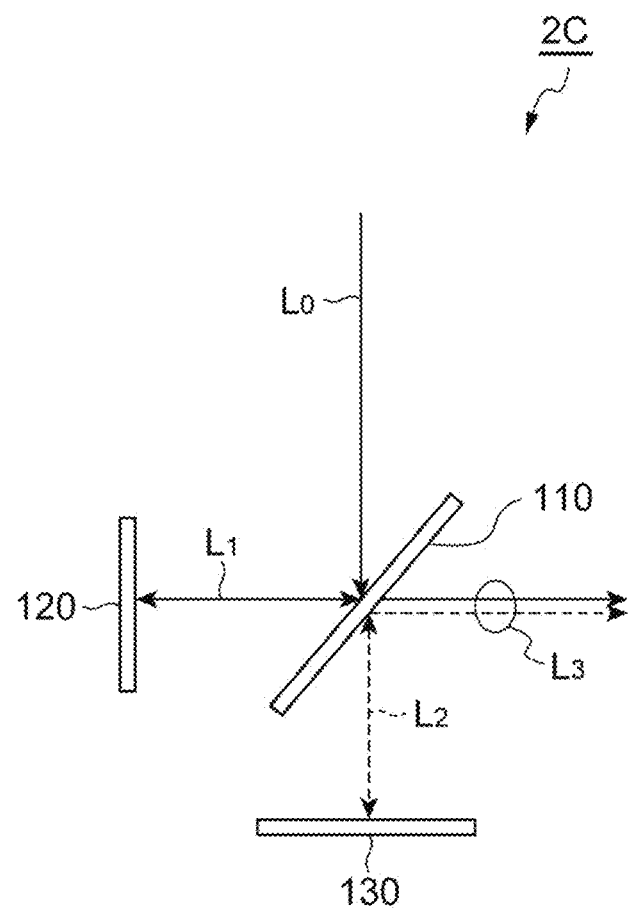
FIG. 6 is a diagram illustrating a configuration of an optical interferometer 2C of a third comparative example.

This is described by referring to an optical interferometer 2C that has a general configuration for performing both branching and combining with a single beam splitter as illustrated in FIG. 6. FIG. 6 is a diagram illustrating a configuration of the optical interferometer 2C of a third comparative example.

In the optical interferometer 2C, incident light $L_0$ enters a beam splitter 110 and is branched by the beam splitter 110 to first branched light $L_1$ of a reflected component, and second branched light $L_2$ of a transmitted component. The first branched light $L_1$ is reflected by a mirror 120 to enter the beam splitter 110 again, and the second branched light $L_2$ is reflected by a mirror 130 to enter the beam splitter 110 again. A component of the first branched light $L_1$ that enters the beam splitter 110 from the mirror 120 and transmits through the beam splitter 110, and a component of the second branched light $L_2$ that enters the beam splitter 110 from the mirror 130 and is reflected by the beam splitter 110 are combined to form combined light $L_3$.

Assume that the reflectance of light of the beam splitter 110 is R, the transmittance of light of the beam splitter 110 is 1−R. At this time, the interference intensity peak $I_{pp}$ of the combined light $L_3$ is represented by the following formula (13). The interference intensity peak $I_{pp}$ is a quadratic function of a variable R, and reaches the maximum value 0.5 (50%) at R=0.5. That is, in the optical interferometer 2C, an ideal optical branching ratio of the beam splitter 110 is 1:1 to reach the maximum interference intensity peak $I_{pp}$.

[Formula 13]
$$I_{pp}=2\times\sqrt{R(1-R)\times R(1-R)}=2R(1-R) \qquad (13)$$

Figure 7:
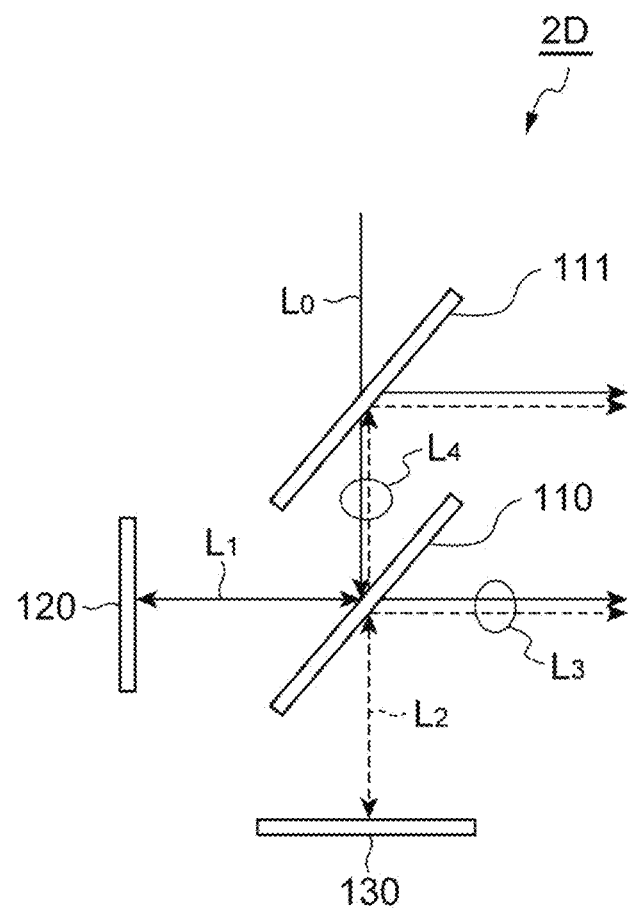
FIG. 7 is a diagram illustrating a configuration of an optical interferometer 2D of a fourth comparative example.

In the configuration of the optical interferometer 2C illustrated in FIG. 6, a component of the first branched light $L_1$ that enters the beam splitter 110 from the mirror 120 and is reflected by the beam splitter 110, and a component of the second branched light $L_2$ that enters the beam splitter 110 from the mirror 130 and transmits through the beam splitter 110 are combined to form combined light $L_4$. To detect the combined light $L_4$, consider an optical interferometer 2D having a configuration as illustrated in FIG. 7. FIG. 7 is a diagram illustrating a configuration of the optical interferometer 2D of a fourth comparative example.

The optical interferometer 2D of the fourth comparative example illustrated in FIG. 7 includes a beam splitter 111 in addition to the configuration of the optical interferometer 2C of the third comparative example illustrated in FIG. 6. The beam splitter 111 is inserted on the optical path of the incident light $L_0$ to detect the combined light $L_4$. By inserting the beam splitter 111, the loss of the incident light $L_0$ occurs. As a result, assume that the optical branching ratio of each of the beam splitters 110 and 111 is 1:1, the interference intensity peak $I_{pp}$ of the total of the combined light $L_3$ and the combined light $L_4$ is 37.5%.

This means that the optical interferometer 2C that has a general configuration and performs both branching and combining with a single beam splitter is the ideal interferometer capable of achieving the maximum efficiency of 50%, and this maximum efficiency 50% is regarded as the limit efficiency in principle. The reason why the configuration of the optical interferometer 1A of the present embodiment illustrated in FIG. 5 can overcome such a limit efficiency in principle is that the branching-combining unit 10 includes the branching surface 11 and the combining surface 14 separately, with the branching surface 11 and the combining surface 14 disposed at a certain interval from each other, so that the second output surface 15 from which the second combined light $L_{41}$ is output, and the branching surface 11 that receives the incident light $L_0$ can be provided separately.

Here, the ideal reflectance of light R of the beam splitter 110 is 50% in the configuration of the optical interferometer 2C of the third comparative example illustrated in FIG. 6. However, the ideal reflectance of light R in the optical interferometer 1A of the present embodiment illustrated in FIG. 5 at respective surfaces is not 50%. The interference intensity peak $I_{ppT}$ of the total of the combined light $L_3$ and the combined light $L_{41}$ in the optical interferometer 1A of the present embodiment is a quartic function of the variable R, as represented by the above formula (12). In the range of 0<R<1, the maximum value is 49.9% at R=30%. Ideally, R=30% in the optical interferometer 1A of the present embodiment. Further, at R=50%, the interference intensity peak $I_{ppT}$ is 37.5%.

When the branching-combining unit 10 is made of silicon, and the light enters each surface vertically, the ideal beam splitter is provided with the reflectance of 30%. In the actual design, however, the vertical incidence is not possible, and therefore, the average interference intensity peak is compared by considering the S-polarization components and the P-polarization components, as described above.

Figure 8:
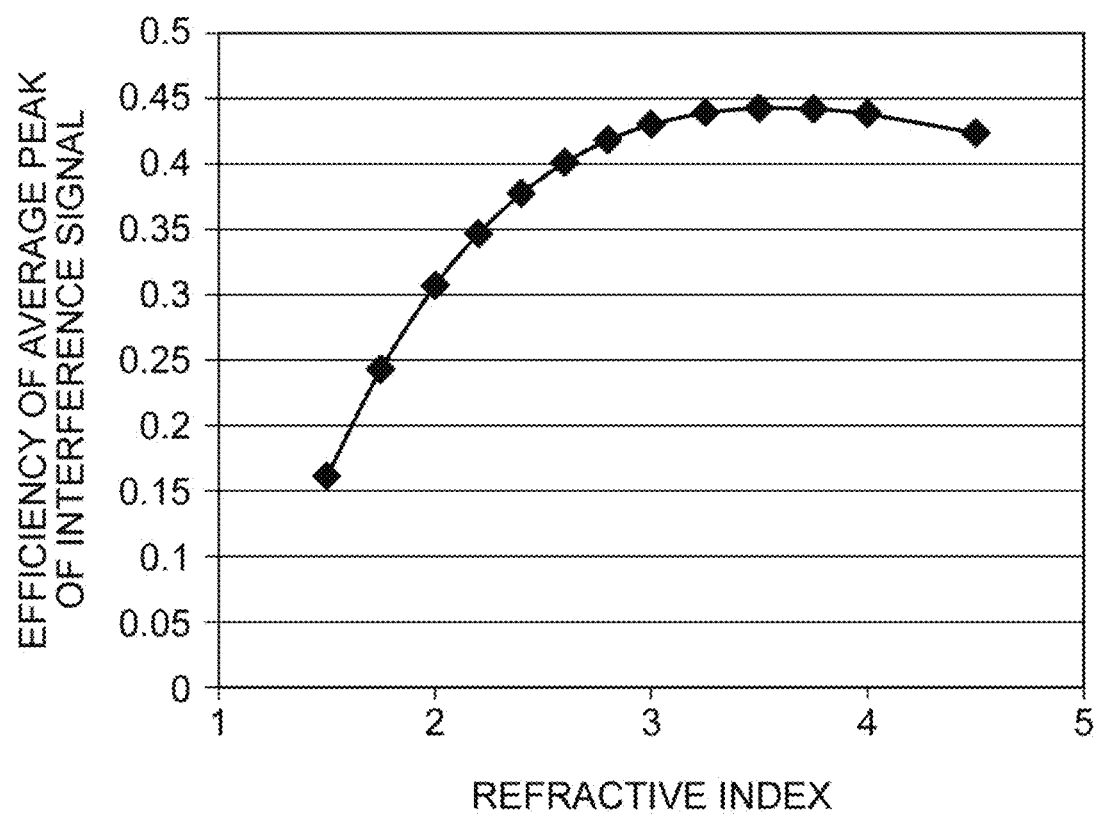
FIG. 8 is a graph illustrating a relationship between a refractive index of a material of a branching-combining unit 10 and an average interference intensity peak.

FIG. 8 is a graph illustrating a relationship between the refractive index of a material of the branching-combining unit 10 and the average interference intensity peak. Calculation is based on the light incident angle of 45 degrees when the light enters the branching-combining unit 10 from the outside. From the calculation result, it is found that the average interference intensity peak reaches the maximum value 44% at the refractive index 3.5. Since the refractive index of silicon is 3.5 in the near-infrared region, silicon is probably the ideal material for forming the branching-combining unit 10 in the optical interferometer 1A of the present embodiment for branching and combining using the difference in refractive index between air and the material of the branching-combining unit 10.

Next, a method of detecting the interference signal of the combined light $L_3$ and the combined light $L_{41}$ in the optical interferometer 1A of the first embodiment is described. First to third detecting methods will be described sequentially.

A first detecting method of receiving light with a single photodetector by optically combining the first combined light $L_3$ and the second combined light $L_{41}$ in some way is considered. Further, since the white light is simply formed by linearly adding light beams having continuous wavelengths, light having one wavelength alone is considered below. Assume that ω represents an angular frequency of light and t represents time variable.

An electric field $E_3$ of the first combined light $L_3$ output from the combining surface 14 is represented as a sum of the electric field $a_{13} \sin(\omega t + \phi_{13})$ of the first branched light reaching the combining surface 14 and the electric field $a_{23} \sin(\omega t + \phi_{23})$ of the second branched light reaching the combining surface 14, as represented by the following formula (14) and formula (15).

[Formula 14]
$$E_3 = a_{13}\sin(\omega t + \phi_{13}) + a_{23}\sin(\omega t + \phi_{23}) \qquad (14)$$
$$= a_3 \sin(\omega t + \phi_3)$$

[Formula 15]
$$a_3 = \sqrt{a_{13}^2 + a_{23}^2 + 2a_{13}a_{23}\cos(\phi_{13} - \phi_{23})} \qquad (15)$$
$$\phi_3 = \tan^{-1}\left[\frac{a_{13}\sin(\phi_{13}) + a_{23}\sin(\phi_{23})}{a_{13}\cos(\phi_{13}) + a_{23}\cos(\phi_{23})}\right]$$

When a square law detector such as a photodiode receives the first combined light $L_3$, the signal output from the square law detector represents a temporal average value of a square of the electric field $E_3$ of the first combined light $L_3$ (i.e., a square of an amplitude $a_3$ of the electric field), and depends on a phase difference ($\phi_{13}$-$\phi_{23}$). This is the fundamental principle for obtaining a signal change according to the optical path difference using the optical interferometer. The phase difference ($\phi_{13}$-$\phi_{23}$) in the formula of the amplitude $a_3$ of the electric field $E_3$ of the first combined light $L_3$ corresponds to the optical path difference between the first branched light and the second branched light set by the drive unit, and therefore, has no relationship with an initial phase. The phase $\phi_3$ in the sin function relating to the temporal change of the electric field $E_3$ of the first combined light $L_3$ depends on both the optical path difference and the initial phase.

An electric field $E_4$ of the second combined light $L_{41}$ output from the second output surface 15 is represented as a sum of the electric field $a_{14} \sin(\omega t + \phi_{14})$ of the first branched light reaching the second output surface 15 and the electric field $a_{24} \sin(\omega t + \phi_{24})$ of the second branched light reaching the second output surface 15, as represented by the following formula (16) and formula (17).

[Formula 16]

-continued $$E_4 = a_{14}\sin(\omega t + \phi_{14}) + a_{24}\sin(\omega t + \phi_{24}) \quad (16)$$
$$= a_4\sin(\omega t + \phi_4)$$

[Formula 17]

$$a_4 = \sqrt{a_{14}^2 + a_{24}^2 + 2a_{14}a_{24}\cos(\phi_{14} - \phi_{24})} \quad (17)$$
$$\phi_4 = \tan^{-1}\left[\frac{a_{14}\sin(\phi_{14}) + a_{24}\sin(\phi_{24})}{a_{14}\cos(\phi_{14}) + a_{24}\cos(\phi_{24})}\right]$$

Assume that a phase change when the second combined light propagates from the combining surface 14 to the second output surface 15 is represented by $\phi_\omega$. The phase change $\phi_\omega$ depends on the angular frequency $\omega$. Phases $\phi_{13}$, $\phi_{23}$, $\phi_{14}$, and $\phi_{24}$ are related as represented by the following formula (18). Therefore, the phase difference ($\phi_{14}$-$\phi_{24}$) in the formula of the amplitude $a_4$ of the electric field $E_1$ of the second combined light is equal to the phase difference $\phi_{13}$-$\phi_{23}$) in the formula of the amplitude $a_3$ of the electric field $E_3$ of the first combined light.

[Formula 18]

$$\phi_{14} = \phi_\omega + \phi_{13}$$

$$\phi_{24} = \phi_\omega + \phi_{23} \quad (18)$$

For simplification, consider the case where the optical path lengths of the first branched light and the second branched light are set equal by the drive unit, that is, the case where both the phase difference ($\phi_{13}$-$\phi_{23}$) and the phase difference ($\phi_{14}$-$\phi_{24}$) are 0. At this time, the following formula (19) is satisfied.

[Formula 19]

$$\phi_3 = \phi_{13}$$

$$\phi_4 = \phi_\omega + \phi_{13} \quad (19)$$

An electric field $E_T$ of the total combined light obtained by combining the first combined light $L_3$ and the second combined light $L_{41}$ is represented as a sum of the electric field $E_3$ of the first combined light $L_3$ and the electric field $E_4$ of the second combined light $L_{41}$ as represented by the following formula (20) and formula (21).

[Formula 20]

$$E_T = E_3 + E_4 \quad (20)$$
$$= a_3\sin(\omega t + \phi_3) + a_4\sin(\omega t + \phi_4)$$
$$= a_3\sin(\omega t + \phi_{13}) + a_4\sin(\omega t + \phi_\omega + \phi_{13})$$
$$= a_T\sin(\omega t + \phi_T)$$

[Formula 21]

$$a_T = \sqrt{a_3^2 + a_4^2 + 2a_3a_4\cos(\phi_\omega)} \quad (21)$$
$$\phi_T = \tan^{-1}\left[\frac{a_3\sin(\phi_{13}) + a_4\sin(\phi_\omega + \phi_{13})}{a_3\cos(\phi_{13}) + a_4\cos(\phi_\omega + \phi_{13})}\right]$$

A signal output from the photodetector receiving the total combined light differs for each wavelength, as affected by the phase $\phi_\omega$ that differs for each wavelength. This means that the interference signal changes due to a factor other than the optical path difference between the first branched light and the second branched light, so that the optical interferometer does not function properly.

A second detecting method of detecting the first combined light $L_3$ and the second combined light $L_{41}$ separately with different photodetectors and adding voltage signals after square-law detection by respective photodetectors is considered. In this method, no influence of the phase $\phi_\omega$ appears, so that adding the voltage signals as the interference signal functions properly. Generally, however, the photodetector includes an amplifier for amplifying the signal to obtain a voltage level appropriate for processing the signal after output. When a photovoltaic type light receiving element is used, an overall S/N is determined according to a noise of the amplifier in the first stage. When the first combined light $L_3$ and the second combined light $L_{41}$ are detected by different photodetectors and the signals are amplified, the overall noise becomes twice as large as the noise of the first-stage amplifier of each photodetector. Thus, the signal level increases by adding the voltage signals, however, the S/N is not improved. In the present embodiment, the efficiency of the first combined light $L_3$ is 26.4% and the efficiency of the second combined light $L_{41}$ is 17.8%, and thus, the signal amount is not simply doubled regardless of the addition, and the S/N decreases.

A third detecting method of detecting the first combined light $L_3$ and the second combined light $L_{41}$ with different light receiving elements, adding/subtracting the current signals output from the light receiving elements, and converting the result to the voltage signal is considered. In this method, the S/N decreasing problem described above can be avoided. The third detecting method is described below, and the configuration of the detection unit 50 according to this method is described as well.

Electromagnetic waves including light sometimes change their phases when being reflected by an interface between two media having different refractive indexes. An amount of phase change at the reflection of light on the interface depends on the refractive index of each medium, the incident angle of light to the interface, and the polarization state of light. Assume that each medium is made of a dielectric material and an absorption coefficient can be ignored, then the phase change occurs at the reflection of light on the interface when the S-polarization light enters the interface from the medium having a low refractive index, and when the P-polarization light enters the interface from the medium having a high refractive index at an incident angle not exceeding a Brewster's angle, and in both cases, a phase change amount is π.

By considering such a characteristic, the phase change amount at the reflection of light in the configuration of the optical interferometer 1A illustrated in FIG. 5 is considered. Assume that the phase of the first branched light $L_{12}$ and the second branched light $L_{22}$ that enter the combining surface 14 is a reference phase, a phase change π occurs when the S-polarization component of the second branched light $L_{22}$ is reflected on the combining surface 14 to form the first combined light $L_3$, and a phase change π occurs when the P-polarization component of the first branched light $L_{12}$ is reflected on the combining surface 14 to form the second combined light $L_{41}$.

Thus, the second combined light $L_{41}$ output from the second output surface 15 has a phase difference π with respect to the first combined light $L_3$ output from the combining surface 14 for the S-polarization component and the P-polarization component. That is, the first combined light $L_3$ and the second combined light $L_{41}$ form the interference signals having opposite signs. In addition to the generation of the phase change π at the reflection of the S-polarization component of the second branched light $L_{22}$ on the combining surface 14 as described above, the phase change π is generated in the S-polarization component of the first branched light $L_{11}$ at the branching of the incident light $L_0$ on the branching surface 11, and therefore, the S-polarization components of the first branched light $L_{12}$ and the second branched light $L_{22}$ at the combining have the same phase. Further, the P-polarization components of the first branched light $L_{12}$ and the second branched light $L_{22}$ at the combining have also the same phase. As a result, the S-polarization components and the P-polarization components have the interference signal of the same sign.

Here, in practice, when the mirrors in the first optical system 20 and the second optical system 30 are metallic mirrors, the phase change occurs at the reflection of light by the metallic mirror. When the first optical system 20 and the second optical system 30 reflect light by the mirrors having a common configuration, the same phase change occurs for both the S-polarization components and the P-polarization components, so that, as a result, the interference signals of the S-polarization components and the P-polarization components have the same sign.

Figure 9:
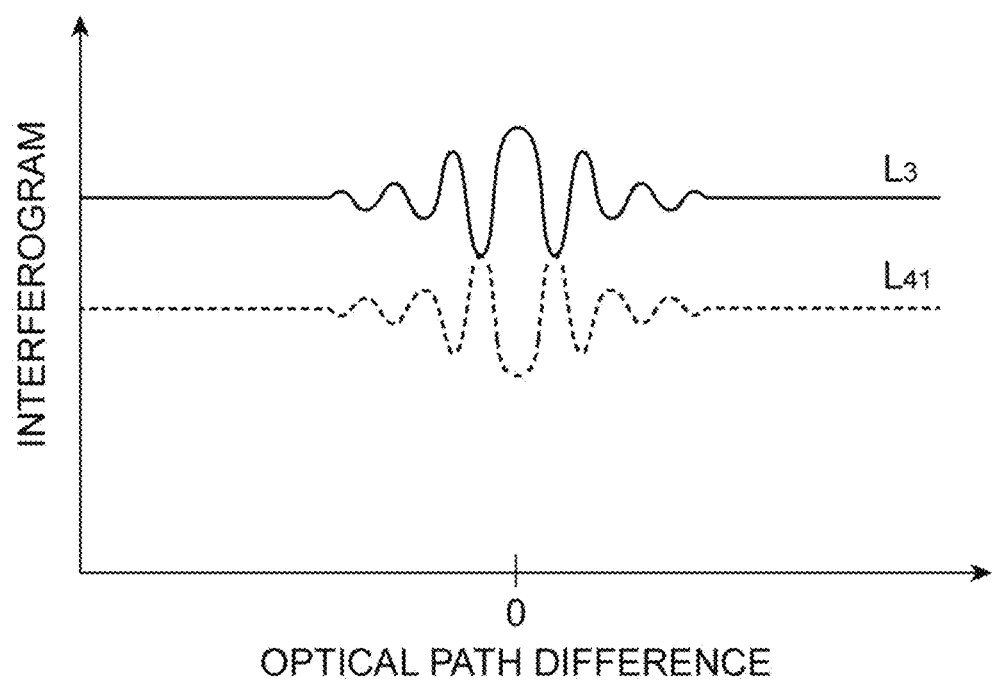
FIG. 9 shows interferograms of combined light $L_3$ and combined light $L_{41}$.

For the first combined light $L_3$ and the second combined light $L_{41}$, the interference signals have opposite signs over the entire wavelengths. FIG. 9 shows interferograms of the combined light $L_3$ and the combined light $L_{41}$. When the optical path difference is 0, the interference signal of the first combined light $L_3$ is at the maximum value, and the interference signal of the second combined light $L_{41}$ is at the minimum value. One of the interferogram of the first combined light $L_3$ and the interferogram of the second combined light $L_{41}$ corresponds to the interferogram obtained by reversing the other interferogram upside down about the average value and correcting the amplitude according to the efficiency.

Here, in FIG. 9, the interferograms of the first combined light $L_3$ and the second combined light $L_{41}$ are shown with different average values. The average value of the interferogram depends on the configuration of the optical interferometer. For example, when the average value of the interferogram increases because more background light enters the photodetector than non-interference light from the optical interferometer, the difference of the average values of the interferograms between the first combined light $L_3$ and the second combined light $L_{41}$ is not so large. In contrast, when the average value of the interferogram increases because more non-interference light from the optical interferometer enters the photodetector than the background light, the average value is determined at a ratio similar to the efficiency of the interference signal at each interferogram of the first combined light $L_3$ and the second combined light $L_{41}$.

Figure 10:
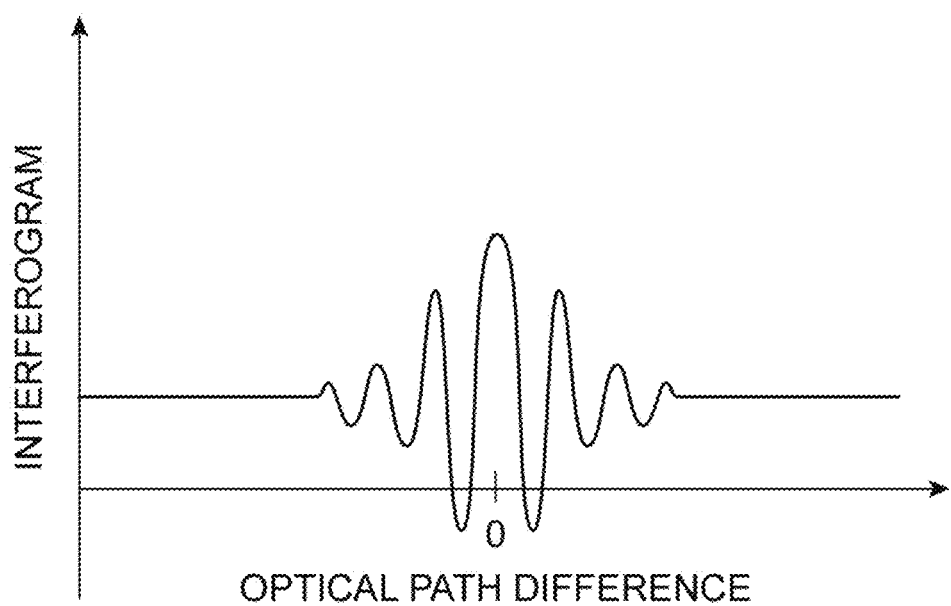
FIG. 10 shows a difference between the interferograms of the combined light $L_3$ and the combined light $L_{41}$.

Thus, by obtaining the difference between the interferograms of the first combined light $L_3$ and the second combined light $L_{41}$, the average value decreases and the interference signal increases. FIG. 10 shows the difference between the interferograms of the combined light $L_3$ and the combined light $L_{41}$. By obtaining the difference between them, interference signal may partially be a negative value which, however, causes no problem on a circuit of the detection unit 50 illustrated in FIG. 11.

Figure 11:
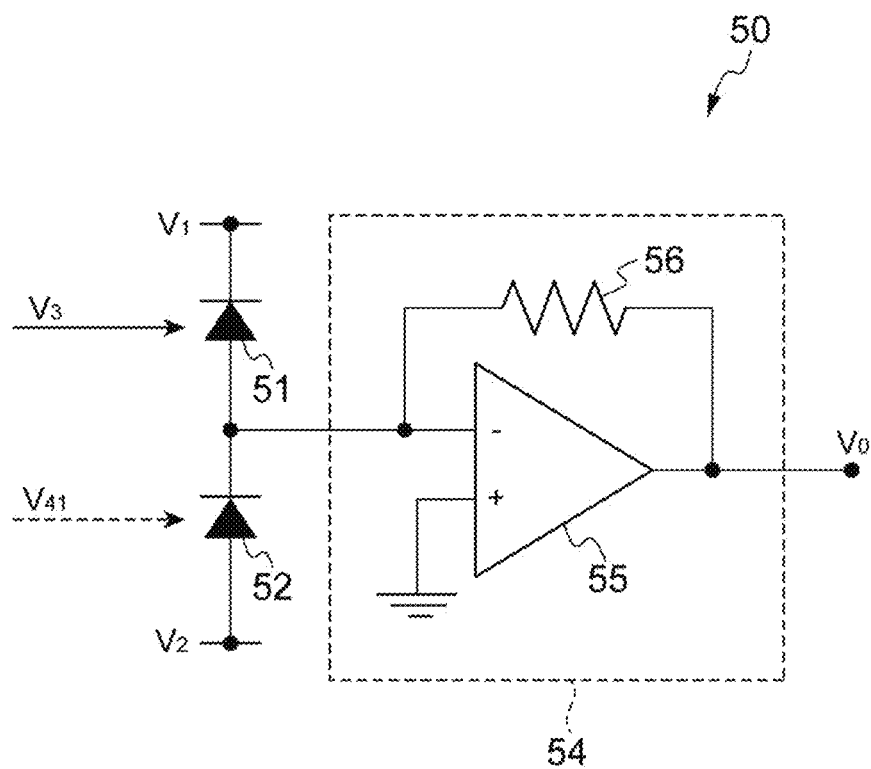
FIG. 11 is a circuit diagram of a detection unit 50 of the optical interferometer 1A of the first embodiment.

FIG. 11 is a circuit diagram of the detection unit 50 of the optical interferometer 1A of the first embodiment. The detection unit 50 includes the first light receiving element 51, the second light receiving element 52, and the current-voltage conversion unit 54. The current-voltage conversion unit 54 includes an amplifier 55 and a feedback resistor 56. The feedback resistor 56 is provided between an inverted input terminal and an output terminal Vo of the amplifier 55.

The first light receiving element 51 and the second light receiving element 52 are photovoltaic type elements such as photodiodes. The first light receiving element 51 and the second light receiving element 52 are connected in series between a first reference potential terminal V1 and a second reference potential terminal V2 to which an inverse voltage is applied. V1 is a positive potential and V2 is a negative potential. A connection point between the first light receiving element 51 and the second light receiving element 52 is connected to the inverted input terminal of the amplifier 55. The non-inverted input terminal of the amplifier 55 is connected to a ground potential terminal. The inverted input terminal, which is in an imaginary short relationship with the non-inverted input terminal of the amplifier 55, is also at the ground potential.

The first light receiving element 51 receives the first combined light $L_3$ output to the outside from the combining surface 14, and outputs a first current signal $I_1$ according to the amount of received light. The second light receiving element 52 receives the second combined light $L_{41}$ output to the outside from the second output surface 15, and outputs a second current signal $I_2$ according to the amount of received light. A current $(I_1-I_2)$ which is a difference between the first current signal $I_1$ and the second current signal $I_2$ flows in the feedback resistor 56, and a voltage value according to a product of the current value of the difference and the resistance value of the feedback resistor 56 appears at the output terminal Vo. That is, the current-voltage conversion unit 54 can output a voltage signal according to a value $(I_1-I_2)$ obtained by subtracting the second current signal $I_2$ from the first current signal $I_1$ from the output terminal Vo.

The voltage signal output from the output terminal Vo represents the difference between the interferograms of the first combined light $L_3$ and the second combined light $L_{41}$, to decrease the average value of the interferogram and emphasize the interference signal. The voltage signal output from the output terminal Vo has a noise determined only by the single amplifier 55, so that the S/N is improved. Further, the decrease of the average value of the interferogram allows the gain of the amplifier 55 to be appropriately set in consideration of the magnitude of the interference signal.

Second Embodiment

Figure 12:
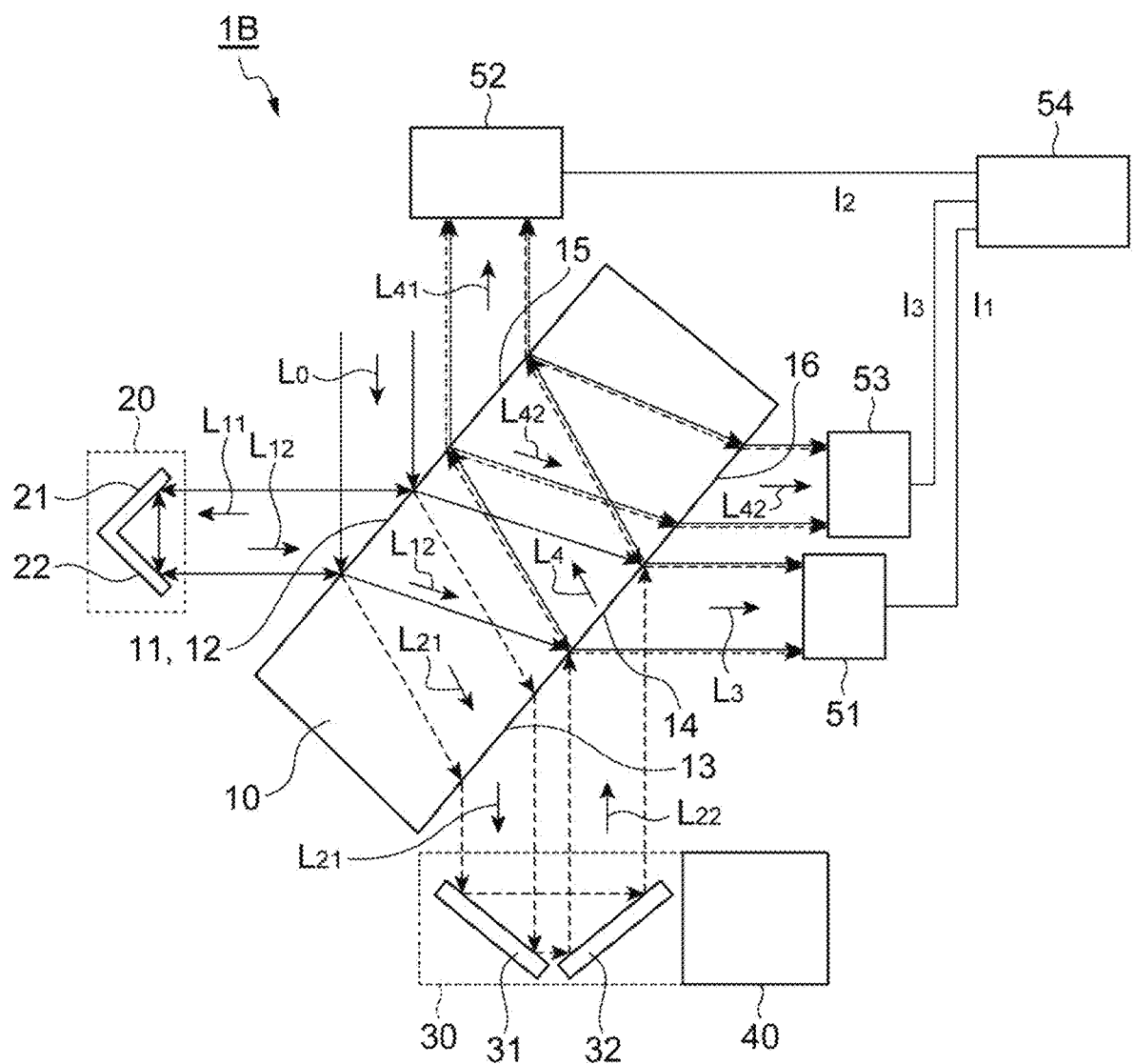
FIG. 12 is a diagram illustrating a configuration of an optical interferometer 1B of a second embodiment.

FIG. 12 is a diagram illustrating a configuration of an optical interferometer 1B of a second embodiment. The optical interferometer 1B includes a branching-combining unit 10, a first optical system 20, a second optical system 30, and a drive unit 40. Preferably, these components of the optical interferometer 1B are configured by MEMS-based components.

The branching-combining unit 10 is made of a transparent member of a semiconductor, such as silicon, and has a branching surface 11, an incident surface 12, a first output surface 13, a combining surface 14, a second output surface 15, and a third output surface 16 on interfaces between the interior and the exterior of the transparent member.

The optical interferometer 1B of the second embodiment illustrated in FIG. 12 differs from the configuration of the optical interferometer 1A of the first embodiment illustrated in FIG. 5 in that the branching-combining unit 10 further includes the third output surface 16. Further, the optical interferometer 1B of the second embodiment differs from the configuration of the optical interferometer 1A of the first embodiment in that the interferometer not only detects the partial light $L_{41}$ of the second combined light $L_4$ transmitted through the second output surface 15 and output to the outside, but also detects, by a third light receiving element 53, the rest of the light $L_{42}$ of the second combined light $L_4$ reflected by the second output surface 15, transmitted through the third output surface 16, and output to the outside.

The number of reflections of the second combined light $L_{42}$ output from the third output surface 16 is only one time larger than that of the second combined light $L_{41}$ output from the second output surface 15. Therefore, the interference intensity peak $I_{pp2}$ of the second combined light $L_{42}$, which is output from the third output surface 16 and received by the third light receiving element 53, is R times the interference intensity peak $I_{pp1}$ of the second combined light $L_{41}$, which is output from the second output surface 15 and received by the second light receiving element 52, as represented by the following formula (22).

[Formula 22]

$$I_{pp2}=I_{pp1}\times R=2R(1-R)^3\cdot R \qquad (22)$$

Assume that the incident angle is 45 degrees for all light beams that enters respective surfaces from the outside, and the branching-combining unit 10 is made of silicon, then the average interference intensity peak of the S-polarization and the P-polarization of the second combined light $L_{42}$ output from the third output surface 16 and received by the third light receiving element 53 is 5.3%. The average interference intensity peak of the P-polarization and the S-polarization of the total of the combined light $L_3$, the combined light $L_{41}$, and the combined light $L_{42}$ is 49.5%, thus achieving an approximately 50% efficiency.

Here, the second combined light reflected by the third output surface 16 may be output to the outside from another output surface and received by another light receiving element, and when the entire second combined light $L_4$ is detected, an overall efficiency of the second combined light $L_4$ is 26.4%. A sum of the efficiency 26.4% of the first combined light $L_3$ and the overall efficiency 26.4% of the second combined light $L_4$ is 52.8%, and this is improved from the efficiency of 49.5% of the total of the combined light $L_3$, the combined light $L_{41}$, and the combined light $L_{42}$ in the configuration of the optical interferometer 1B of FIG. 12, however, the degree of improvement is small. When considering the small improvement and more complicated configuration, it is not advantageous to output the second combined light reflected by the third output surface 16 from another output surface to the outside and receive the output light by another light receiving element.

Figure 13:
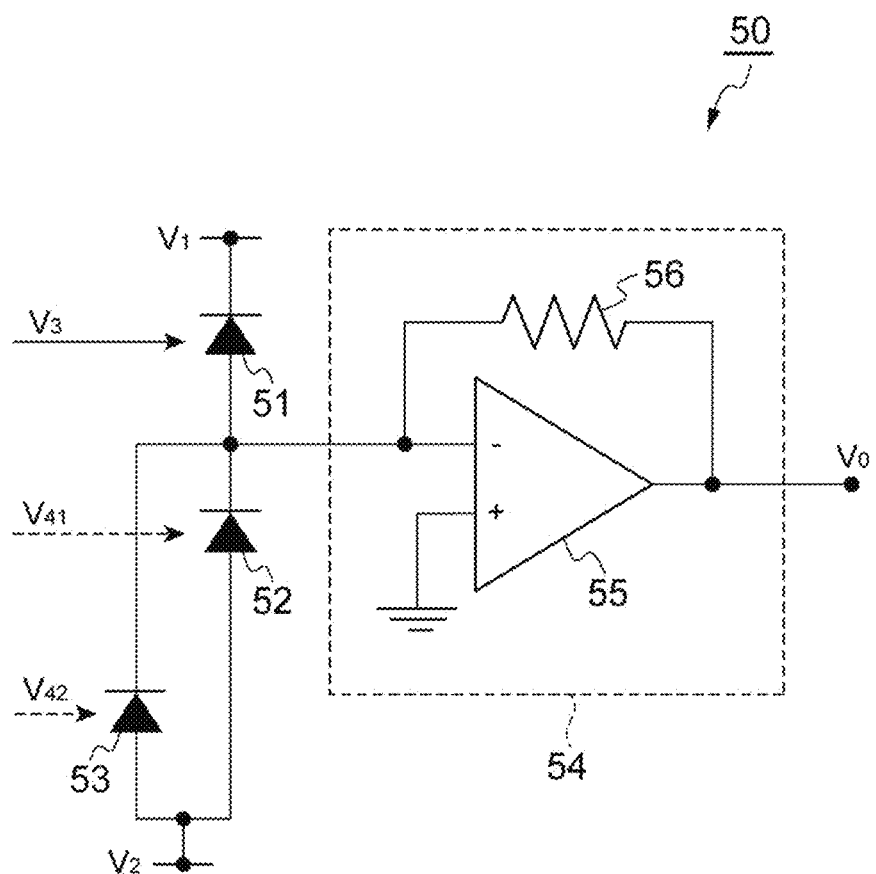
FIG. 13 is a circuit diagram of a detection unit 50 of the optical interferometer 1B of the second embodiment.

FIG. 13 is a circuit diagram of a detection unit 50 of the optical interferometer 1B of the second embodiment. The detection unit 50 includes the first light receiving element 51, the second light receiving element 52, the third light receiving element 53, and the current-voltage conversion unit 54. The detection unit 50 of the second embodiment illustrated in FIG. 13 differs from the configuration of the detection unit 50 of the first embodiment illustrated in FIG. 11 in that the third light receiving element 53 is further included. The third light receiving element 53 is also a photovoltaic type element such as a photodiode.

The phase change at the reflection of the second combined light $L_{42}$ which is output from the third output surface 16 is the same as the phase change at the reflection of the second combined light $L_{41}$ which is output from the second output surface 15. Therefore, the third light receiving element 53 receiving the second combined light $L_{42}$ output from the third output surface 16 is provided in parallel to the second light receiving element 52 that receives the second combined light $L_{41}$ output from the second output surface 15. The third light receiving element 53 receives the second combined light $L_{42}$ output to the outside from the third output surface 16, and outputs the third current signal $I_3$ according to the amount of received light. The current-voltage conversion unit 54 outputs a voltage signal according to a value $(I_1-I_2-I_3)$ obtained by subtracting the second current signal $I_2$ and the third current signal $I_3$ from the first current signal $I_1$ from the output terminal Vo.

Here, in the optical interferometer 1B of the second embodiment, it is necessary to pay more attention when the background light that enters the photodetector is larger than the non-interference light from the optical interferometer to increase the average value of the interferogram. In this case, the average values of the interferograms of the respective combined light beams are about the same, so that the average value component of a single interferogram appears in the value $(I_1-I_2-I_3)$ obtained by subtracting the second current signal $I_2$ and the third current signal $I_3$ from the first current signal $I_1$. As a result, the addition of the third light receiving element 53 may sometimes narrows the dynamic range. It is necessary, therefore, to determine whether the addition of the third light receiving element 53 is effective or not by considering if the S/N is finally improved.

Third Embodiment

Figure 14:
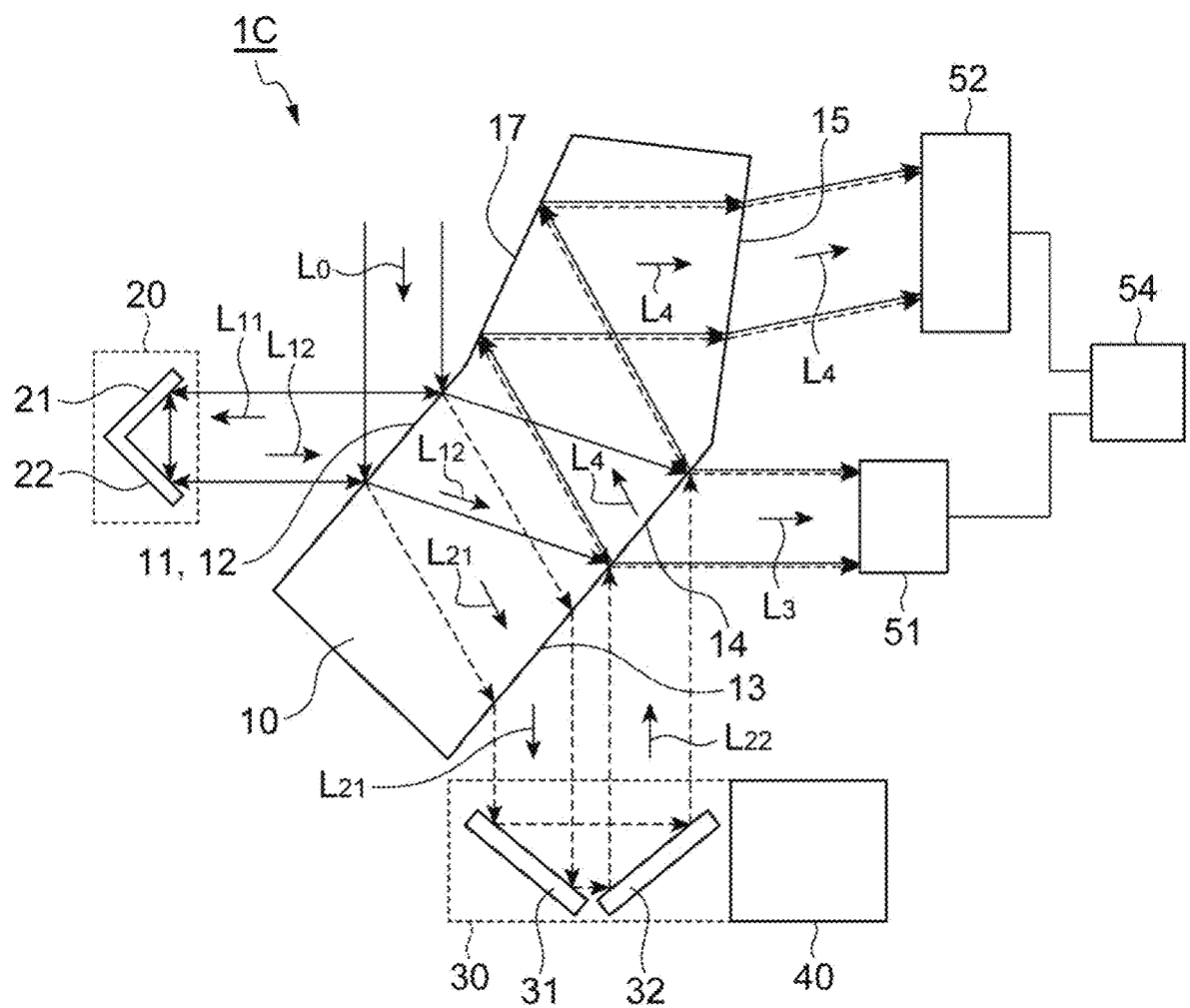
FIG. 14 is a diagram illustrating a configuration of an optical interferometer 1C of a third embodiment.

FIG. 14 is a diagram illustrating a configuration of an optical interferometer 1C of a third embodiment. The optical interferometer 1C includes a branching-combining unit 10, a first optical system 20, a second optical system 30, and a drive unit 40. Preferably, these components of the optical interferometer 1C are configured by MEMS-based components.

The branching-combining unit 10 is made of a transparent member of a semiconductor, such as silicon, and has a branching surface 11, an incident surface 12, a first output surface 13, a combining surface 14, a second output surface 15, and a total reflection surface 17 on interfaces between the interior and the exterior of the transparent member.

The optical interferometer 1C of the third embodiment illustrated in FIG. 14 differs from the configuration of the optical interferometer 1A of the first embodiment illustrated in FIG. 5 in that the branching-combining unit 10 further includes the total reflection surface 17. The branching-combining unit 10, on the total reflection surface 17, totally reflects the second combined light $L_4$ that reaches from the combining surface 14 through the interior and directs the light to the second output surface 15.

In the third embodiment, the direction of the total reflection surface 17 is set such that the total reflection surface 17 can totally reflect the second combined light $L_4$, that is, the incident angle of the second combined light $L_4$ to the total reflection surface 17 is equal to or larger than a critical angle. Further, the direction of the second output surface 15 is set such that the second combined light $L_4$ totally reflected by the total reflection surface 17 can be output to the outside from the second output surface 15, that is, the incident angle of the second combined light $L_4$ to the second output surface 15 is less than the critical angle.

In the first embodiment, the branching surface 11 to which the incident light $L_0$ enters, and the second output surface 15 from which the second combined light $L_{41}$ is output are provided on the same side of the branching-combining unit 10, and this sometimes limits the arrangement of the optical systems for the incident light $L_0$ and the second combined light $L_{41}$. In contrast, the third embodiment includes the branching surface 11 on one side of the branching-combining unit 10, and the combining surface 14 and the second output surface 15 on the other side of the branching-combining unit 10, thus facilitating the arrangement of the optical systems for the incident light $L_0$ and the combined light $L_3$ and the combined light $L_{41}$.

The optical interferometer according to the present invention is not limited to the embodiments and configuration examples described above, and various modifications can be made.

An optical interferometer of the above-described embodiment includes a branching-combining unit, a first optical system, a second optical system, and a drive unit. The branching-combining unit includes a branching surface, an incident surface, a first output surface, a combining surface, and a second output surface on an interface between the interior and the exterior of a transparent member, the branching surface and the combining surface are provided separately, the branching surface partially reflects incident light entering from the outside and outputs as first branched light, and transmits the rest of the incident light into the interior as second branched light, the incident surface transmits the first branched light entering from the branching surface via the first optical system into the interior, the first output surface outputs the second branched light reaching from the branching surface through the interior to the outside, the combining surface partially combines the first branched light reaching from the incident surface through the interior, and the second branched light entering from the first output surface via the second optical system to be output to the outside as first combined light, and combines the rest of the first branched light and the second branched light to be propagated into the interior as second combined light, and the second output surface partially outputs the second combined light reaching from the combining surface through the interior to the outside. The first optical system reflects the first branched light output from the branching surface by a mirror, and directs the light to the incident surface. The second optical system reflects the second branched light output from the first output surface by a mirror, and directs the light to the combining surface. The drive unit moves the mirror of the first optical system or the second optical system to adjust an optical path difference between the first branched light and the second branched light from the branching surface to the combining surface.

Preferably, the optical interferometer of the above-described configuration further includes a first light receiving element receiving the first combined light output from the combining surface and outputting a first current signal $I_1$ according to an amount of the received light, a second light receiving element receiving the second combined light partially output from the second output surface and outputting a second current signal $I_2$ according to an amount of the received light, and a current-voltage conversion unit outputting a voltage signal according to a value $(I_1-I_2)$ obtained by subtracting the second current signal $I_2$ from the first current signal $I_1$.

Preferably, in the optical interferometer of the above-described configuration, the branching-combining unit further includes a third output surface on the interface between the interior and the exterior of the transparent member, and the third output surface outputs the rest of the second combined light reflected by the second output surface and reaching through the interior to the outside.

Further, preferably, in this case, the optical interferometer of the above-described configuration further includes a first light receiving element receiving the first combined light output from the combining surface and outputting a first current signal $I_1$ according to an amount of the received light, a second light receiving element receiving the second combined light partially output from the second output surface and outputting a second current signal $I_2$ according to an amount of the received light, a third light receiving element receiving the rest of the second combined light output from the third output surface and outputting a third current signal $I_3$ according to an amount of the received light, and a current-voltage conversion unit outputting a voltage signal according to a value $(I_1-I_2-I_3)$ obtained by subtracting the second current signal $I_2$ and the third current signal $I_3$ from the first current signal $I_1$.

Preferably, in the optical interferometer of the above-described configuration, the branching-combining unit further includes a total reflection surface on the interface between the interior and the exterior of the transparent member, and the total reflection surface totally reflects the second combined light reaching from the combining surface through the interior and directs the light to the second output surface.

Preferably, in the optical interferometer of the above-described configuration, the first optical system and the second optical system include an even number of mirrors in total, and the optical interferometer branches a light ray at each position in a beam cross-section of the incident light on the branching surface, and then combines the light rays at a common position in a beam cross-section of the first combined light and the second combined light on the combining surface.

Preferably, in the optical interferometer of the above-described configuration, the branching-combining unit, the first optical system, the second optical system, and the drive unit are MEMS (Micro Electro-Mechanical System)-based components. Further, preferably, in the optical interferometer of the above-described configuration, the branching-combining unit is made of silicon.

Preferably, in the optical interferometer of the above-described configuration, the first branched light and the second branched light have the same optical path length in the branching-combining unit.

INDUSTRIAL APPLICABILITY

The present invention can be used as an optical interferometer capable of decreasing a ratio of excessive loss.

REFERENCE SIGNS LIST 1A-1C—optical interferometer, 10—branching-combining unit, 11—branching surface, 12—incident surface, 13—first output surface, 14—combining surface, 15—second output surface, 16—third output surface, 17—total reflection surface, 20—first optical system, 21, 22—mirror, 30—second optical system, 31, 32—mirror, 40—drive unit, 50—detection unit, 51—first light receiving element, 52—second light receiving element, 53—third light receiving element, 54—current-voltage conversion unit, 55—amplifier, 56—feedback resistor, 90—dispersion compensating member, $L_0$—incident light, $L_{11}$, $L_{12}$—first branched light, $L_{21}$, $L_{22}$—second branched light, $L_3$—first combined light, $L_4$, $L_{41}$, $L_{42}$—second combined light.

The invention claimed is:

1. An optical interferometer comprising a branching-combining unit; a first optical system; a second optical system; and a drive unit, wherein the branching-combining unit includes a branching surface, an incident surface, a first output surface, a combining surface, and a second output surface on an interface between the interior and the exterior of a transparent member, the branching surface and the combining surface are provided separately, the branching surface partially reflects incident light entering from the outside and outputs as first branched light, and transmits the rest of the incident light into the interior as second branched light, the incident surface transmits the first branched light entering from the branching surface via the first optical system into the interior, the first output surface outputs the second branched light reaching from the branching surface through the interior to the outside, the combining surface partially combines the first branched light reaching from the incident surface through the interior, and the second branched light entering from the first output surface via the second optical system to be output to the outside as first combined light, and combines the rest of the first branched light and the second branched light to be propagated into the interior as second combined light, the second output surface partially outputs the second combined light reaching from the combining surface through the interior to the outside, the first optical system is configured to reflect the first branched light output from the branching surface by a mirror, and direct the light to the incident surface, the second optical system is configured to reflect the second branched light output from the first output surface by a mirror, and direct the light to the combining surface, and the drive unit is configured to move the mirror of the first optical system or the second optical system to adjust an optical path difference between the first branched light and the second branched light from the branching surface to the combining surface, and wherein the branching-combining unit further includes a total reflection surface on the interface between the interior and the exterior of the transparent member, and the total reflection surface totally reflects the second combined light reaching from the combining surface through the interior and directs the second combined light to the second output surface, so that the branching surface is provided on one side of the branching-combining unit, and the combining surface and the second output surface are provided on the other side of the branching-combining unit.

2. The optical interferometer according to claim 1, further comprising:
a first light receiving element configured to receive the first combined light output from the combining surface and output a first current signal $I_1$ according to an amount of the received light;
a second light receiving element configured to receive the second combined light partially output from the second output surface and output a second current signal $I_2$ according to an amount of the received light; and
a current-voltage conversion unit configured to output a voltage signal according to a value $(I_1-I_2)$ obtained by subtracting the second current signal $I_2$ from the first current signal $I_1$.

3. The optical interferometer according to claim 1, wherein the branching-combining unit further includes a third output surface on the interface between the interior and the exterior of the transparent member, and the third output surface outputs the rest of the second combined light reflected by the second output surface and reaching through the interior to the outside.

4. The optical interferometer according to claim 3, further comprising:
a first light receiving element configured to receive the first combined light output from the combining surface and output a first current signal $I_1$ according to an amount of the received light;
a second light receiving element configured to receive the second combined light partially output from the second output surface and output a second current signal $I_2$ according to an amount of the received light;
a third light receiving element configured to receive the rest of the second combined light output from the third output surface and output a third current signal $I_3$ according to an amount of the received light; and
a current-voltage conversion unit configured to output a voltage signal according to a value $(I_1-I_2-I_3)$ obtained by subtracting the second current signal $I_2$ and the third current signal $I_3$ from the first current signal $I_1$.

5. The optical interferometer according to claim 1, wherein the first optical system and the second optical system include an even number of mirrors in total, and
the optical interferometer is configured to branch a light ray at each position in a beam cross-section of the incident light on the branching surface, and then combine the light rays at a common position in a beam cross-section of the first combined light and the second combined light on the combining surface.

6. The optical interferometer according to claim 1, wherein the branching-combining unit, the first optical system, the second optical system, and the drive unit are MEMS-based components.

7. The optical interferometer according to claim 1, wherein the branching-combining unit is made of silicon.

8. The optical interferometer according to claim 1, wherein the first branched light and the second branched light have the same optical path length in the branching-combining unit.

* * * * *